United States Patent
Capoglu et al.

(10) Patent No.: US 10,823,869 B2
(45) Date of Patent: Nov. 3, 2020

(54) CURRENT INJECTION VIA CAPACITIVE COUPLING

(71) Applicant: Halliburton Energy Services, Inc., Houston, TX (US)

(72) Inventors: Ilker R. Capoglu, Houston, TX (US); Burkay Donderici, Houston, TX (US); Paul Gregory James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 90 days.

(21) Appl. No.: 16/322,887

(22) PCT Filed: Sep. 28, 2016

(86) PCT No.: PCT/US2016/054132
§ 371 (c)(1),
(2) Date: Feb. 1, 2019

(87) PCT Pub. No.: WO2018/063184
PCT Pub. Date: Apr. 5, 2018

(65) Prior Publication Data
US 2020/0278469 A1    Sep. 3, 2020

(51) Int. Cl.
*G01V 3/24* (2006.01)

(52) U.S. Cl.
CPC ..................... *G01V 3/24* (2013.01)

(58) Field of Classification Search
CPC ... G01V 3/20; G01V 3/24; G01V 3/26; E21B 49/00; E21B 47/113; E21B 47/10;
(Continued)

(56) References Cited

U.S. PATENT DOCUMENTS

| 7,151,377 B2 | 12/2006 | Chouzenoux et al. |
| 8,242,928 B2 * | 8/2012 | Prammer ................ E21B 47/06 340/853.7 |

(Continued)

FOREIGN PATENT DOCUMENTS

| CN | 101240137 A | 8/2008 |
| CN | 101698776 A | 4/2010 |

(Continued)

OTHER PUBLICATIONS

International Searching Authority, Patent Cooperation Treaty, International Search Report and Written Opinion, International application No. PCT/US16/54132, entire document, which is a PCT parent to the instant application.
(Continued)

*Primary Examiner* — Vinh P Nguyen
(74) *Attorney, Agent, or Firm* — Gilliam IP PLLC

(57) ABSTRACT

A casing has a plurality of joints of pipe joined by a plurality of casing collars, and an outer surface. A high-frequency alternating current (AC) source electrically is coupled to the casing. A coating of insulating material covers the entire outer surface of the casing. The coating has an opening that exposes a casing portion. The casing and the coating of insulating material define a capacitive electrode having an impedance $Z_f$ with a magnitude $|Z_f|$ at the frequency of operation f of the high-frequency AC source. $Z_f$ is low enough to allow current from the high-frequency AC source to be injected from the casing through the coating of insulating material into a surrounding formation. The casing portion has a resistance R to direct current (DC) with a magnitude that is very large compared to $|Z_f|$.

20 Claims, 24 Drawing Sheets

(58) Field of Classification Search
CPC .... E21B 47/085; E21B 49/005; E21B 47/092; E21B 12/00; E21B 10/62; E21B 47/13; E21B 10/08; G01N 27/06
See application file for complete search history.

(56) References Cited

U.S. PATENT DOCUMENTS

| | | |
|---|---|---|
| 9,091,785 B2 | 7/2015 | Donderici et al. |
| 9,841,525 B2 * | 12/2017 | Bloemenkamp ........ G01V 3/265 |
| 9,938,822 B2 * | 4/2018 | Fouda ...................... G01V 3/20 |
| 10,241,229 B2 * | 3/2019 | Samson ................... G01V 3/12 |
| 10,424,027 B1 * | 9/2019 | Wilson ................. G01R 33/022 |
| 2005/0109097 A1 | 5/2005 | Bogath et al. |
| 2005/0211445 A1 | 9/2005 | Ravi |
| 2008/0156534 A1 | 7/2008 | Clark et al. |
| 2013/0277114 A1 | 10/2013 | Hook et al. |
| 2013/0299242 A1 | 11/2013 | Veeningen |
| 2014/0222343 A1 | 8/2014 | Samson et al. |
| 2018/0274361 A1 * | 9/2018 | Fouda ................... E21B 47/113 |

FOREIGN PATENT DOCUMENTS

| | | | |
|---|---|---|---|
| WO | 2017086956 | A1 | 5/2017 |
| WO | 2017086957 | A1 | 5/2017 |

OTHER PUBLICATIONS

English (machine)Translation of CN101240137.
English (machine) Translation of CN101698776.

* cited by examiner

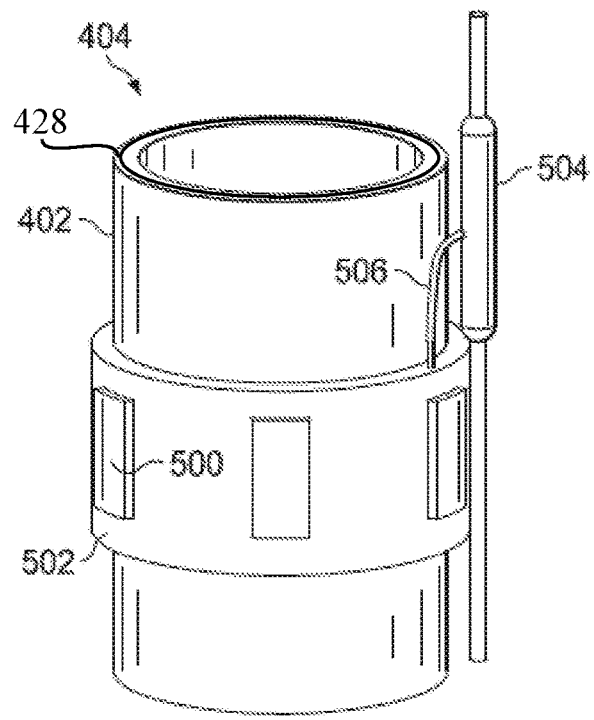
FIG. 5A
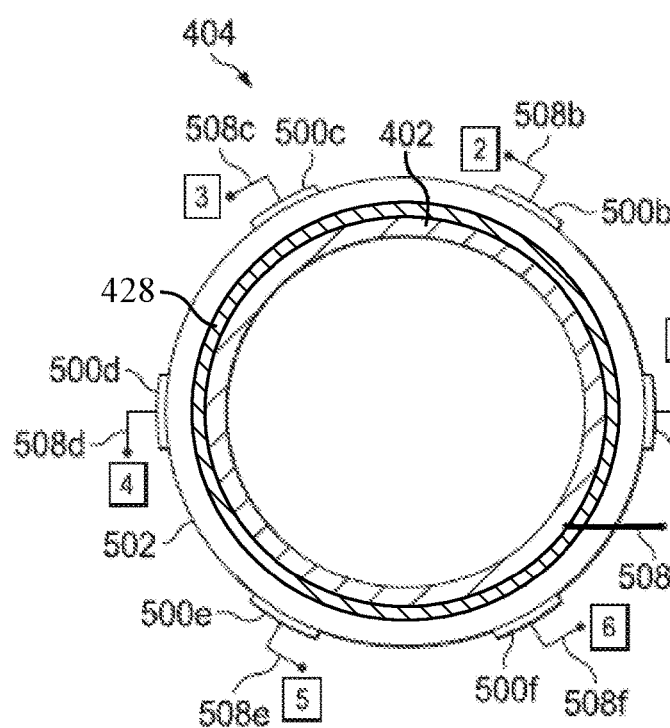
FIG. 5B
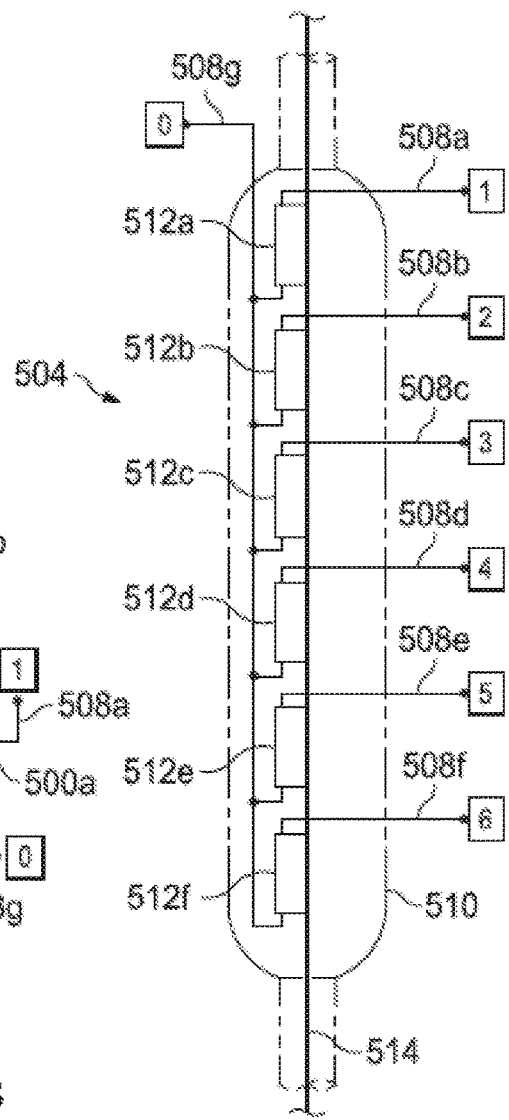

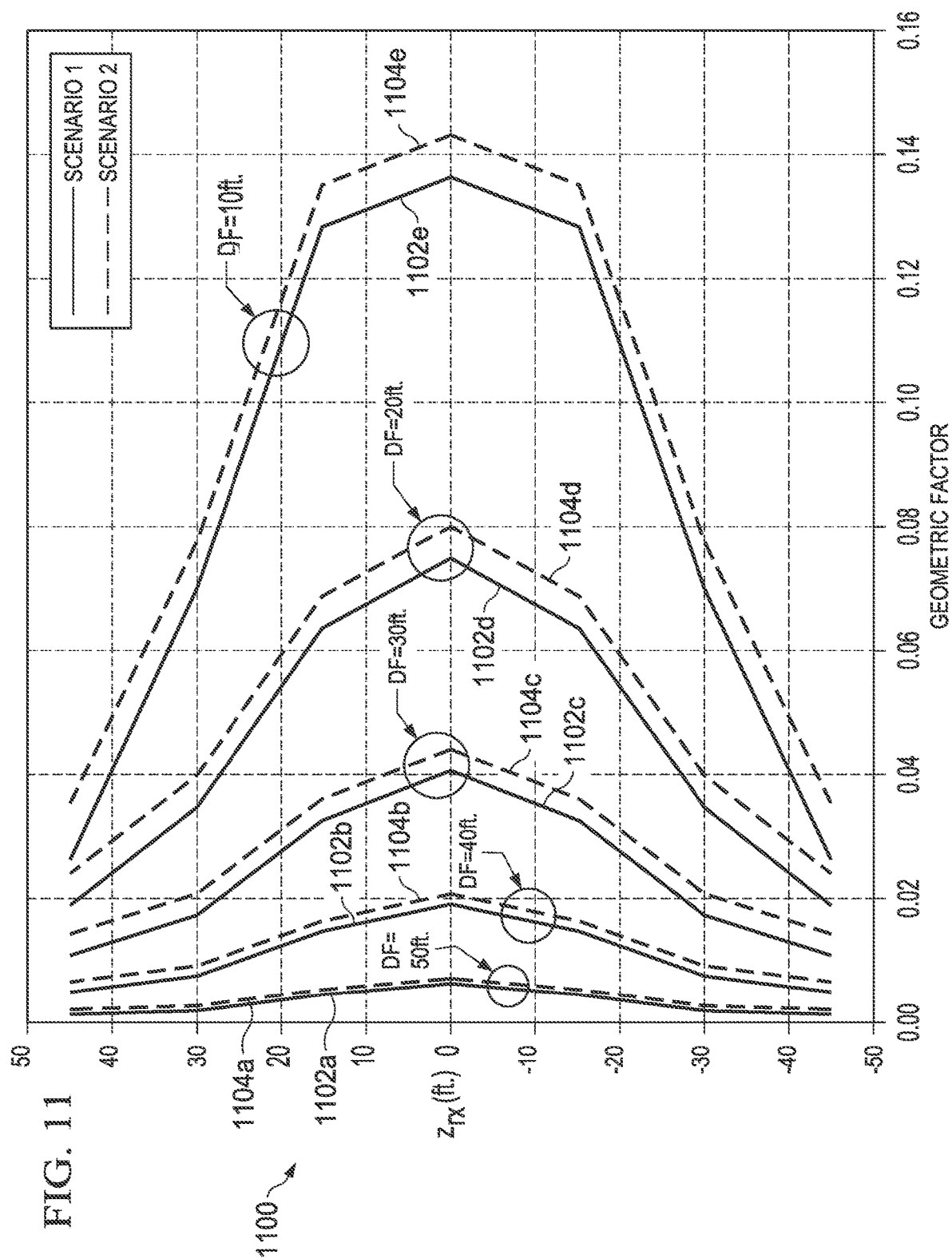

CURRENT INJECTION VIA CAPACITIVE COUPLING

BACKGROUND

In some enhanced oil recovery efforts, water is injected into a dead well to increase hydrocarbon throughput in an adjacent, producing well. The injected water approaches the producing well in what is called a "water flood." If the water flood breaks through to the producing well, the fluid produced by the producing well will become contaminated with the water. The casing (or a portion of the casing) of the producing well can be used to inject currents into formations surrounding the producing well to assist in the detection of water floods and for other purposes. It is a challenge to provide a high quality, reliable, and predictable current source in the environment of a producing well.

BRIEF DESCRIPTION OF THE DRAWINGS

FIG. 5A is a perspective view of a receiver disposed on a casing and a fiber optic sensor associated with the receiver.

FIG. 5B is a cross-sectional view of a casing-mounted receiver and includes a schematic diagram of transducers disposed within a fiber optic sensor and coupled to the receiver according to a first arrangement.

FIG. 11 is a geometric factor graph corresponding to the embodiments shown in FIGS. 9 and 10.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The equipment and techniques described herein may be useful in sea-based systems, land-based systems, multilateral wells, all types of drilling systems, all types of rigs, measurement while drilling ("MWD")/logging while drilling ("LWD") environments, wired drillpipe environments, coiled tubing (wired and unwired) environments, wireline environments, and similar environments.

This disclosure describes a technique that overcomes the problems that may accompany current injection through uninsulated portions of a casing, such as corrosion and the irregularity and unpredictability of the interface between the uninsulated portions of the casing and the formation fluids. In this technique, the entire casing, including the collars, is coated with a thin coating of insulating material, such as paint, with a thickness and/or with electrical properties that are optimized for the frequency of operation. The casing is excited at the wellhead and current is injected into the formation via capacitive coupling through the paint. Corrosion is thus prevented and contact resistance is eliminated by avoiding direct contact with formation fluids.

Figure 1:
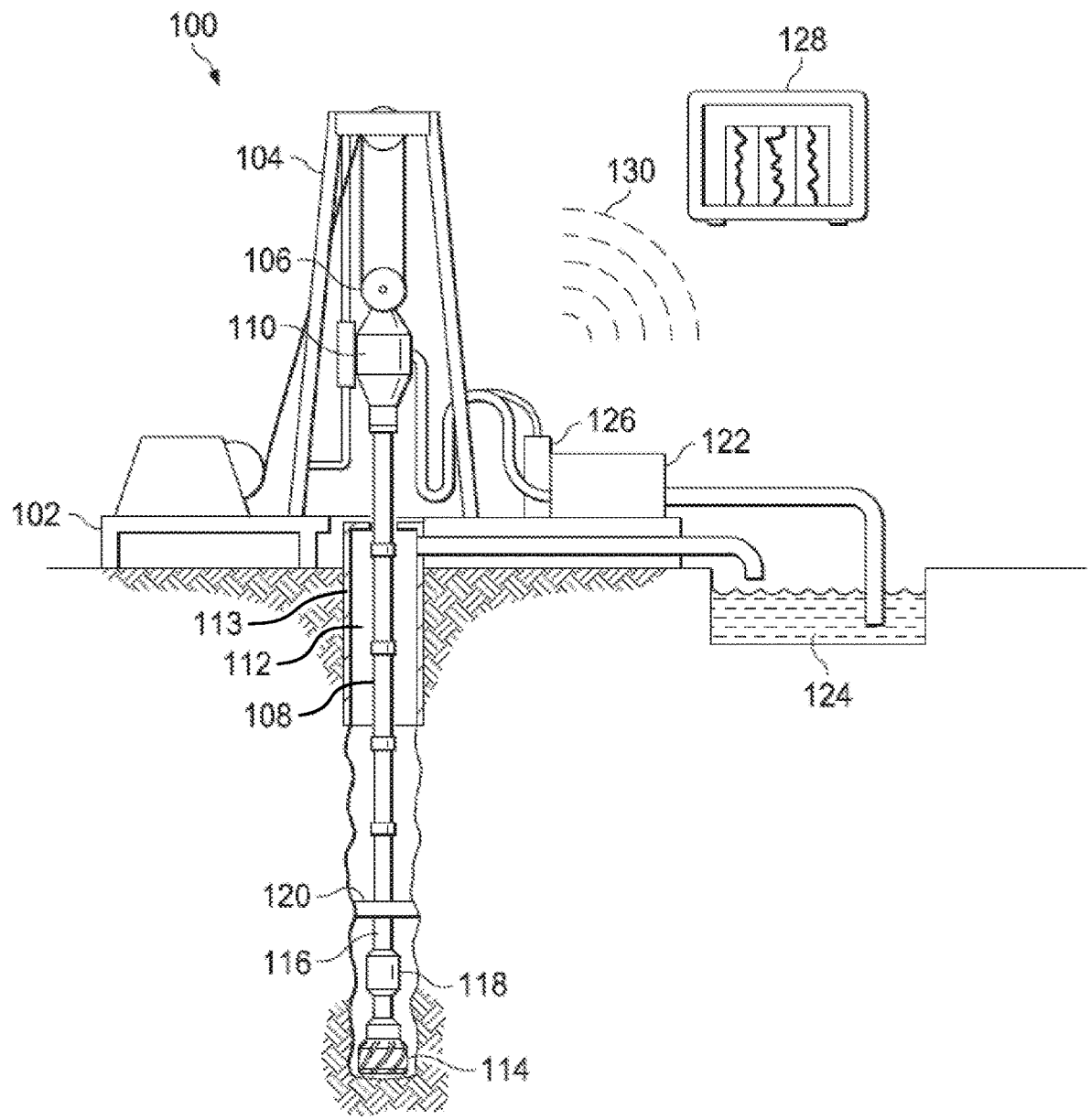
FIG. 1 is a schematic diagram of a drilling environment.

FIG. 1 is a schematic diagram of an illustrative drilling environment. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased). Receivers used to implement the water flood monitoring techniques described herein may be mounted on such a casing string 113, as described below.

The drill collars in the BHA 116 are typically thick-walled steel pipe sections that provide weight and rigidity for the drilling process. The thick walls are also convenient sites for installing transmitters, receivers and logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via electromagnetic or acoustic telemetry or any other suitable communication technique. The scope of disclosure is not limited to these particular examples of data processing units.

Figure 2:
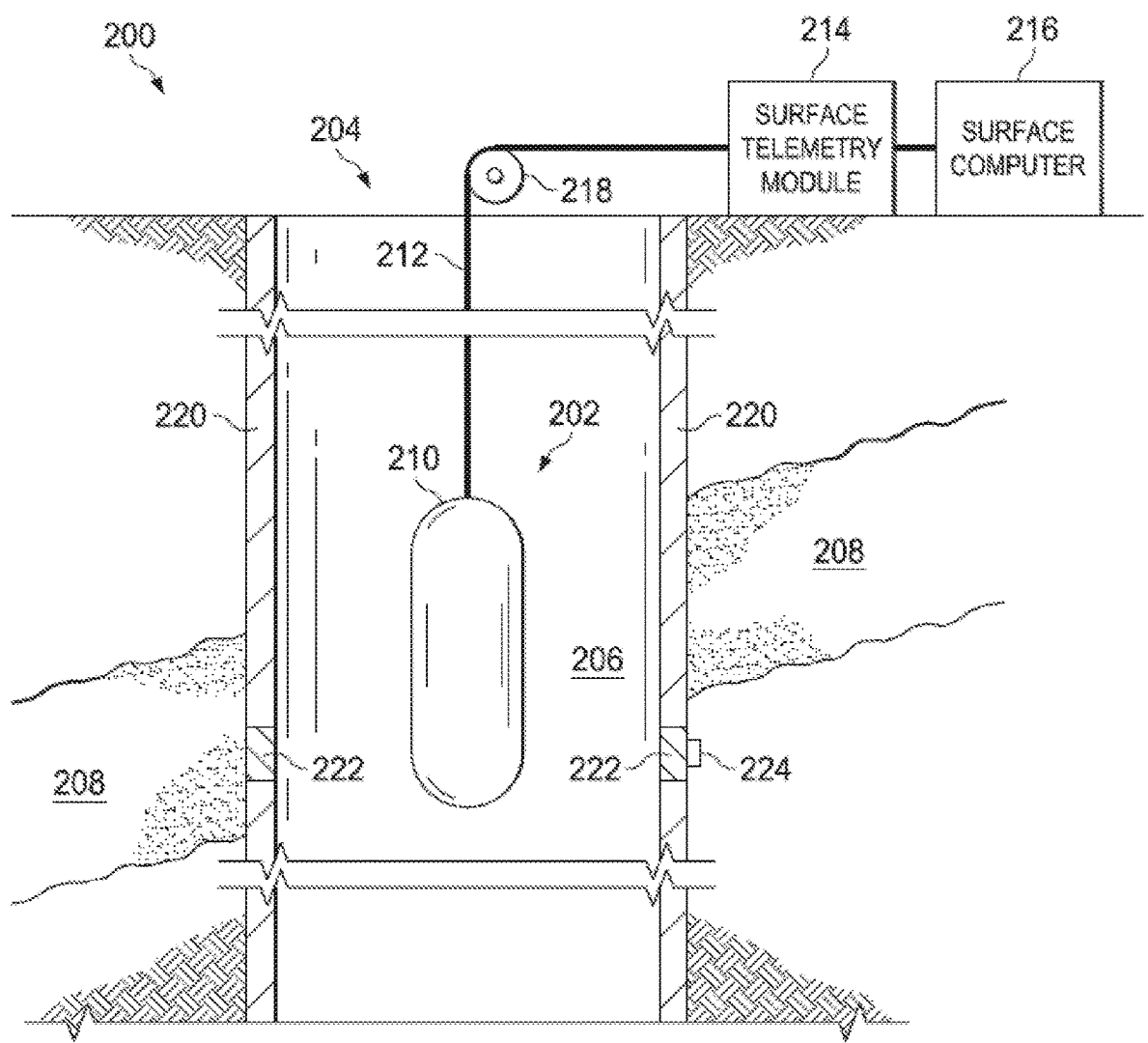
FIG. 2 is a schematic diagram of a wireline environment.

FIG. 2 is a schematic diagram of an illustrative wireline environment. More specifically, FIG. 2 illustrates a logging system 200 in accordance with at least some embodiments. Logging system 200 comprises a wireline logging tool 202 disposed within a borehole 204 proximate to a formation 208 of interest. The borehole 204 contains a casing string 220 and casing fluid 206, which may comprise one or more of oil, gas, fresh water, saline water, or other substances. Receivers used to implement the water flood monitoring techniques described herein may be mounted on such a casing string 220, as described below. The tool 202 comprises a sonde 210 within which various subsystems of the tool 202 reside. These subsystems are equipped to measure various parameters associated with the formation and wellbore. In the illustrative case of FIG. 2 the sonde 210 is suspended within the borehole 204 by a cable 212. Cable 212, in some embodiments a multi-conductor armored cable, not only provides support for the sonde 210, but also in these embodiments communicatively couples the tool 202 to a surface telemetry module 214 and a surface computer 216. The tool 202 may be raised and lowered within the borehole 204 by way of the cable 212, and the depth of the tool 202 within the borehole 204 may be determined by depth measurement system 218 (illustrated as a depth wheel). The casing string 220 may be composed of multiple segments of casing that are joined using casing collars, such as collar 222. In some embodiments, tools (e.g., electrodes, logging equipment, and communication equipment including fiber optics and transmitters and/or receivers) may be included within, coupled to or adjacent to the casing string 220 and/or the collar 222. For example, FIG. 2 includes a transceiver 224 that functions as a transmitter, receiver or both and communicates with other transmitters or receivers in other parts of the borehole 204, within the sonde 210 or at the surface.

Figure 3:
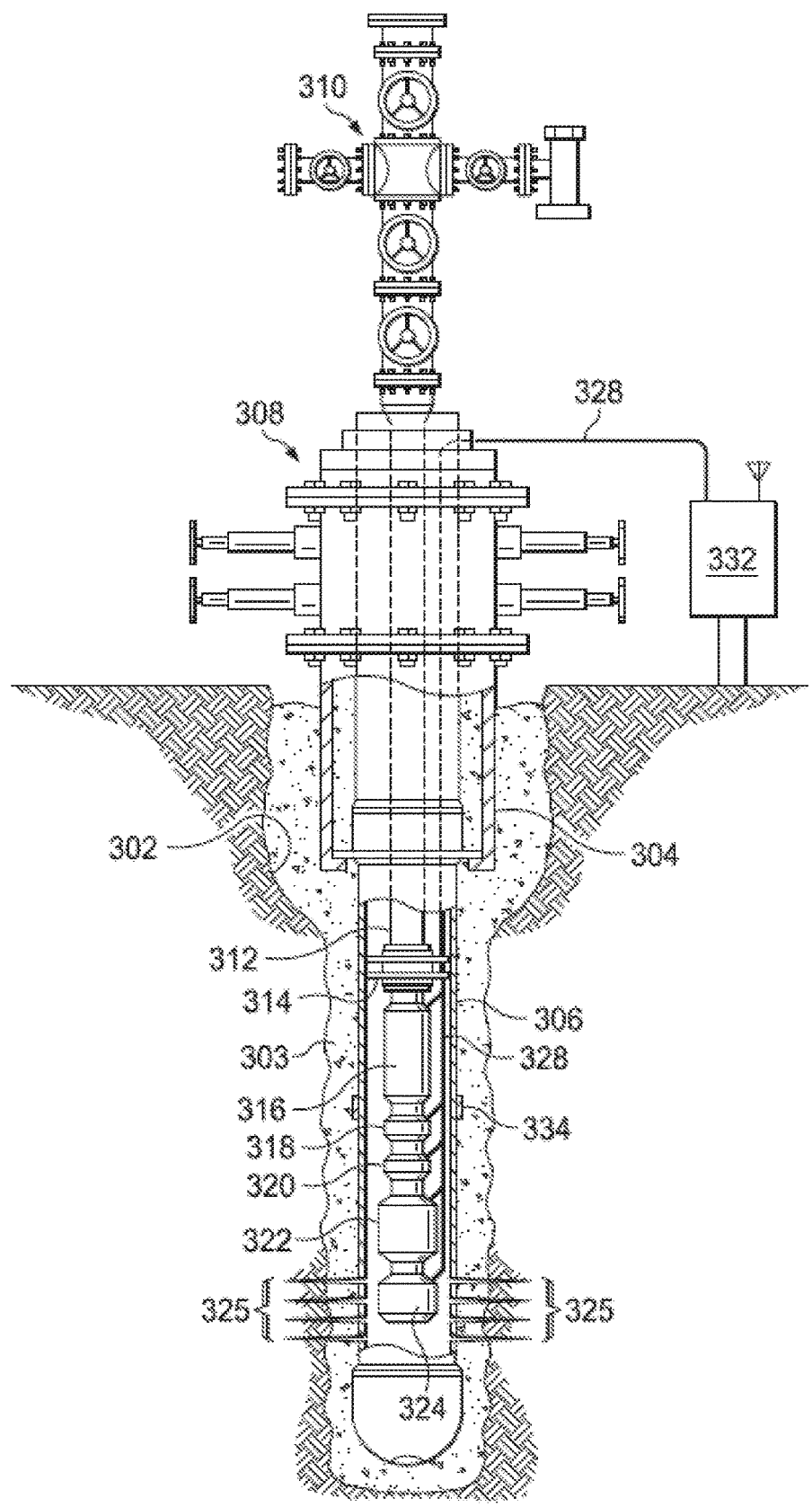
FIG. 3 is a schematic diagram of a production environment.

FIG. 3 is a schematic diagram of a producing well with a borehole 302 that has been drilled into the earth. Such boreholes, examples of which are described above with respect to FIGS. 1 and 2, are routinely drilled to ten thousand feet or more in depth and can be steered horizontally for twice that distance. The producing well includes a casing header 304 and casing 306, both secured into place by cement 303. Blowout preventer (BOP) 308 couples to casing header 306 and production wellhead 310, which together seal in the well head and enable fluids to be extracted from the well in a safe and controlled manner.

The use of measurement devices permanently installed in the well facilitates monitoring of the well and/or the surrounding formation. The different transducers send signals to the surface that may be stored, evaluated and used to monitor the well's operations. Such signals may be transmitted using, e.g., a transmitter 334 that couples to or is disposed within the casing 306 or a collar of the casing 306. Such a transmitter may communicate with a receiver in any part of the system shown in FIG. 3, such as a receiver disposed in another part of the casing 306, within a different casing collar, within the well, or at the surface. Receivers used to implement the water flood monitoring techniques described herein may be mounted on such a casing 306 or casing collar, as described below. Near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 318 and flow meter 320. Additional devices also coupled in-line along production tubing 312 include downhole choke 316 (used to vary the fluid flow restriction), electric submersible pump (ESP) 322 (which draws in fluid flowing from perforations 325 outside ESP 322 and production tubing 312), ESP motor 324 (driving ESP 322), and packer 314 (isolating the production zone below the packer from the rest of the well). Additional surface measurement devices may be used to measure, for example, the tubing head pressure and the electrical power consumption of ESP motor 324. Although the example of FIG. 3 shows a well that incorporates an ESP, the disclosed systems and methods may also be used with wells that incorporate other systems for assisting with the extraction of fluids (e.g., gas lift systems), or with wells without such assist systems that rely on the pressure already present in the formation and/or induced by the injector wells.

Each of the devices along production tubing 312 couples to cable 328, which is attached to the exterior of production tubing 312 and is run to the surface through blowout preventer 308 where it couples to control panel 332. Cable 328 provides power to the devices to which it couples, and further provides signal paths (electrical, optical, etc.,) that enable control signals to be directed from the surface to the downhole devices, and for telemetry signals to be received at the surface from the downhole devices. The devices may be controlled and monitored locally by field personnel using a user interface built into control panel 332, or they may be controlled and monitored by a computer system (not specifically shown). Communication between control panel 332 and such a computer system may be via a wireless network (e.g., a cellular network), via a cabled network (e.g., a cabled connection to the Internet), or a combination of wireless and cabled networks.

Figure 4A:
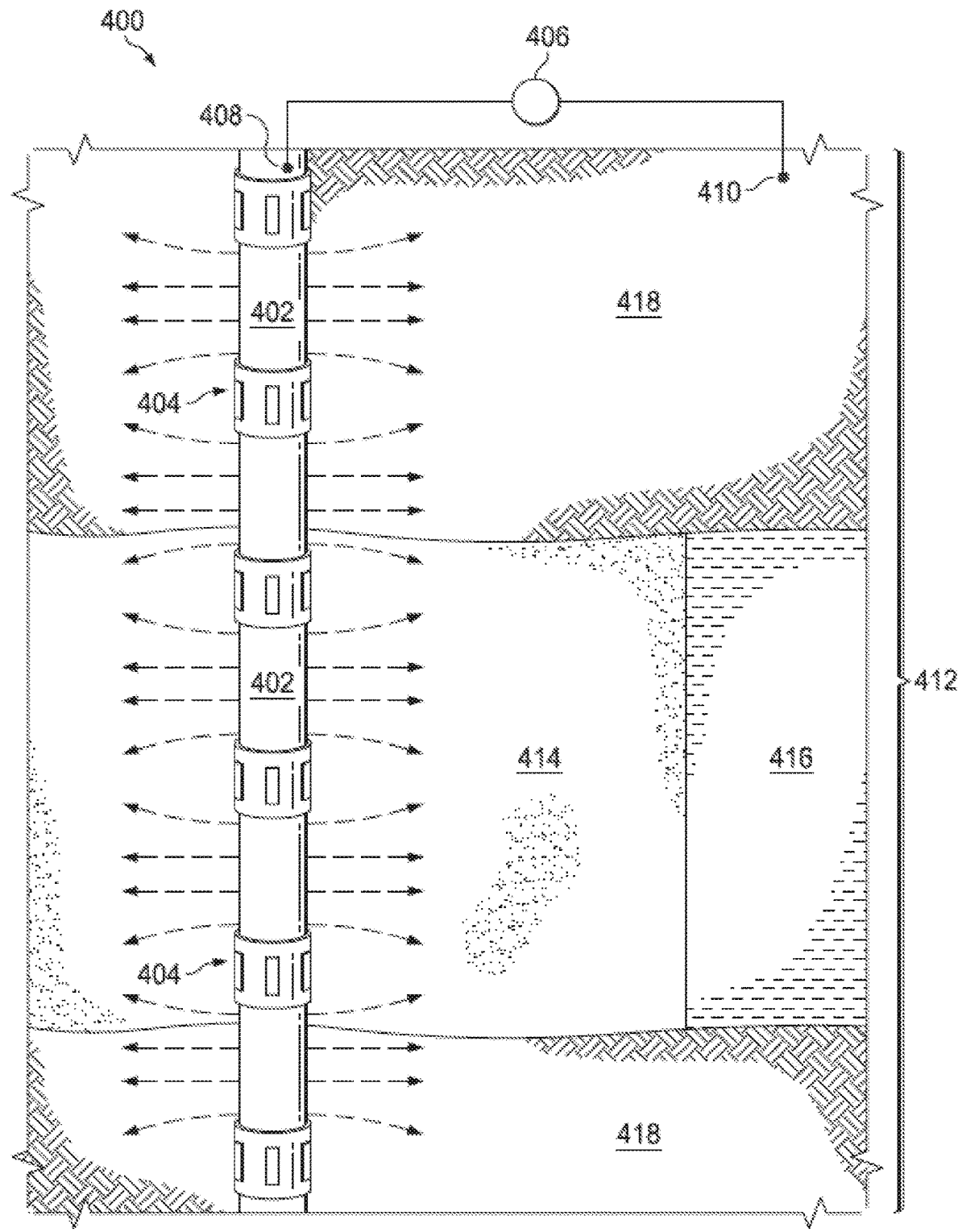
FIG. 4A is a schematic diagram representing water flood monitoring embodiments in which current is injected via a casing.

FIG. 4A is a schematic diagram representing water flood monitoring embodiments in which current is injected into the formation via a casing. More specifically, FIG. 4A shows an environment 400 that includes a conductive casing 402 and receivers 404 mounted on the casing 402. The casing 402 is excited by a current source 406 using an excitation electrode 408 and a return electrode 410 that is positioned any suitable distance (e.g., 100 meters) away from the excitation electrode 408. The portion of the casing 402 depicted in FIG. 4A may be any suitable part of the casing—e.g., close to the well head, in a vertical portion of the well, in a horizontal portion of the well, in a build section of the well, or any combination thereof. The casing 402 is disposed in a formation 412, which includes a reservoir 414, a water flood 416 in proximity to the casing 402, and shoulder beds 418. As the arrows emanating from the casing 402 indicate, current that is injected into the casing 402 by the excitation electrode 408 flows into the formation 412. The precise position of the excitation electrode 408 may be adjusted as desired to achieve the desired current distribution profile along the length of the casing 402. In some embodiments, both the excitation electrode 408 and the return electrode 410 may be positioned on the casing 402, with the return electrode 410 closer to the surface than the excitation electrode 408. In this manner, greater current magnitudes may be achieved toward the downhole end of the casing 402. Other electrode arrangements are contemplated and fall within the scope of this disclosure. Once injected, current flows through the formation 412. Although the resistivity of the formation 412 surrounding the casing 402 is generally uniform (particularly at any given depth), increasing proximity to a water flood will alter the resistivity in the formation 412. Potentials between the casing 402 and electrodes positioned on the receiver 404 reflect these resistivity changes and can be used to determine water flood location, as described below.

Figure 4B:
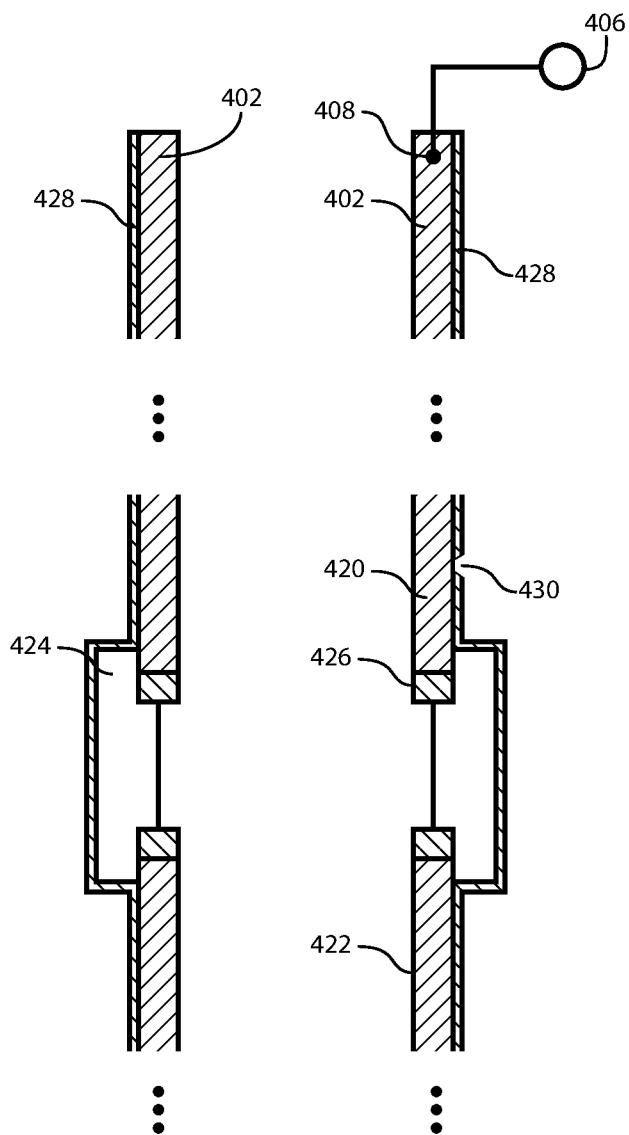
FIG. 4B is a cross-sectional view of a portion of a casing with a coating of an insulting material facilitating capacitive coupling.

FIG. 4B is a cross-sectional view of a portion of a casing with a coating of an insulating material The casing 402 is made up of one or more joints of pipe e.g. 420, 422 connected by one or more casing collars e.g. 424 at threaded connections 426. The casing 402 is coated by a coating of insulating material 428, such as thin layer of paint or coating material. The joints of pipe 420, 422 and the casing collars 424 are covered by the coating of insulating material 428. The coating of insulating material 428 may be made up of a traditional paint (relative permeability 5-8) or a very thin epoxy based coating (relative permeability 3-4) or another suitable material. The thickness of the coating of insulating material 428 is not to scale in FIG. 4B. The coating of insulating material 428 is non-conductive. The casing 402 is excited uphole by applying a high frequency (i.e., greater than 100 kiloHertz (kHz), greater than 500 kHz, or greater than 1 megaHertz (MHz)) alternating current (AC) potential from current source 406 through an electrode 408. The return electrode 410 (not shown in FIG. 4B) is buried in the earth, far away from the casing. As a result, the casing 402 with the coating of insulating material 428 acts as a large capacitive electrode. The coating of insulating material 428 prevents direct contact between the metallic surface of the casing and the formation fluids. The advantages of this are three-fold: (1) contact resistance due to metal-fluid interface is eliminated; (2) corrosion is minimized; and (3) if the capacitive impedance is large, input impedance of the electrode pair 408, 410 is stabilized.

The coating of insulating material 428 may have multiple functionalities besides providing capacitive coupling. It could be composed of rust or corrosion inhibiting agents (see Chinese Patent Publication 101698776 and Chinese Patent Publication 101240137), anti-rust varnish or rust preventive oil. There are coatings that can be applied quite thick; tubulars are commonly plastic coated on their inside diameters to assist with corrosion or wear (See http://www.vallourec.com/DRILLINGPRODUCTS/EN/Products/Pages/Coating.aspx). These are commonly quite thick. Both thermoplastics and epoxy based coatings can be used.

In one or more embodiments, the coating of insulating material 428 is made of paints that are resistant to scratches and abrasion. Such paints are, for example, commonly applied to service equipment (i.e., trucks and the like). In one or more embodiments, the durable coating is a hard coating that will resist abrasion and wear. Such coatings tend to be very brittle and are less tolerate of deformation in the base material. In one or more embodiments, the durable coating is a soft pliable coating. Such coatings may be deformed and are allowed to move so that they may return to their pre-deformation condition and continue to protect the surface. Soft pliable coatings are effective if the substrate bends or is expected to flex, but tend to be less durable for abrasion.

The capacitive coupling addresses the problem present in systems in which the metallic surface of the casing 402 (at least a portion of it) is in direct contact with the formation fluids and current injection occurs through this direct contact. In time, this contact may cause corrosion, potentially compromising integrity of the casing 402. Another problem with maintaining direct contact with the formation fluids is the contact resistance, which is a consequence of the chemical reactions at the metal-surface interface that make the current flow possible. This resistance is highly irregular and unpredictable, depending on many factors including surface area, temperature, acidity, and formation conductivity. Such changes in the contact resistance can make it difficult to post-process and interpret reservoir monitoring data. For example, when different portions of the casing 402 have different contact resistances, injected current may preferentially flow in one area with respect to another. This may create reduced quality of measurements in the zone with lower signal. It may also create an effect that is similar to that of another feature, such as a waterflood in a time-lapse water front detection application. As a result, it is very important to establish uniform contact with the formation that is also stable with respect to time.

While the intent is that the entire casing be covered by the coating of insulating material 428, an opening 430 may occur in the coating of insulating material 428. The opening 430 may be the result of damage caused at a rig or during transportation to the rig or as the result of normal wear and tear. The opening 430 may be the result of the penetration of wires, such as those shown in, for example, FIG. 5, through the coating of insulating material 428. Some openings in the coating of insulating material 428 can be tolerated, as shown below.

To illustrate, assume a joint of pipe 420, 422 is 30 feet long and has an outside diameter of 8 inches. The area ($A_c$) of the outer surface of the casing 402 is 62.8=square feet. Assume the insulating material 428 has a relative permeability $\varepsilon_{coat}$=5 and thickness $t_{coat}$=0.01 inches. The capacitance of the casing 402 coated by the later of insulating material 428 is:

$$C = \frac{\varepsilon_{coat}\varepsilon_0 A_c}{t_{coat}} = 5.16 \ \mu F \quad (1)$$

where $\varepsilon_0$ is the permeability of free space. The impedance of the capacitor at f=100 kHz is:

$$Z_C = \frac{1}{j\omega C} = -0.3084 \ j\Omega \quad (2)$$

As can be seen, the impedance is purely imaginary. Assuming the conductivity of the casing 402 $\sigma_C$ is $10^6$ Siemens per meter (S/m) and the thickness of the casing $t_C$ is 0.5 inches, a defect or scratch in the insulating material 428, such as opening 430, with an area of $A_d$=1 square inch has a resistance $R_d$ that can be approximated to be:

$$R_d = \frac{t_C}{A_d \sigma_C} = 19.68 \ \mu\Omega \quad (3)$$

The resistance calculated in equation (3) is so small that it will be dwarfed by the contact resistance at the interface between the defective area (i.e., the opening 430) and the formation fluids, which is on the order of 1 ohm. The resistance of the defective area (i.e., the opening 430) is approximately:

$$R_d \approx 1 \Omega \quad (4)$$

This impedance is in parallel with the impedance of the capacitor formed by the casing 402 and the coating of insulating material 428. Comparing $R_d$ (~1 ohm) to the magnitude of $Z_C$ (~0.3 ohms), it can be seen that most of the current will pass through the capacitor rather than through the opening 430. The portion of current passing through the capacitor rather than through the opening 430 is more pronounced for higher frequency currents, such as 500 kHz or 1 MHz currents, as can be seen by examining equation (2).

Over time, the current passing through the defect (i.e., the opening 430) will cause corrosion and shut down the conductive path through the defect. Thereafter, the casing 402 and the coating of insulating material 428 can be regarded as the only current path between the casing 402 and the formation. For those reasons, a small amount of damage to the coating of insulating material 428, such as that described above, will not have long-standing detrimental effects on capacitive coupling between the casing 402 and the formation.

The electrical properties of the coating of insulating material 428 (determined by, for example, the type of material, the thickness of the material, the conductivity of the material, and other factors) may be optimized based on formation resistivity and frequency of operation. For example, thicker and less conductive paint may be used in areas with more formation conductivity while thinner and more conductive paint may be used in more resistive areas. The purpose is to make the combined series impedance between the casing and the formation uniform across different zones, which helps avoid the "escaping" of the current through zones with smaller impedances, potentially compromising received signals at high-resistivity zones. The electrical properties of the coating of insulating material 428, determined, for example, by paint thickness, are determined from equations (1) and (2) above.

Figure 4C:
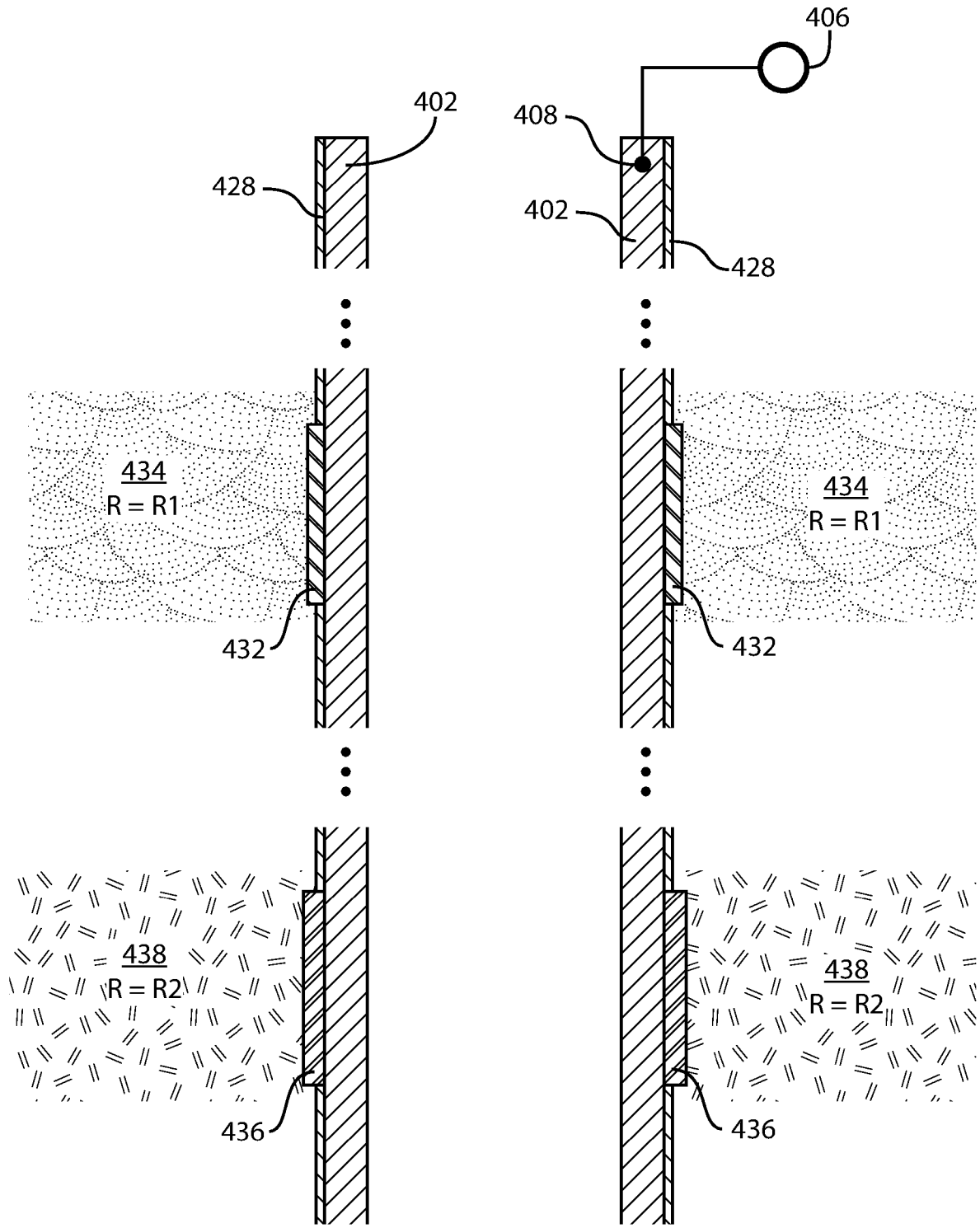
FIG. 4C is a cross-sectional view of a portion of a casing with a coating of an insulting material, where the properties of the insulating material are adjusted to improve capacitive coupling from the casing to surrounding formations.

FIG. 4C is a cross-sectional view of a portion of a casing with a coating of an insulting material, where the properties of the insulating material are adjusted to improve capacitive coupling from the casing to surrounding formations. As can be seen, the coating of insulting material 428 includes a first longitudinal portion 432 where the casing 402 passes through a first formation 434 having a resistance R1 and a second longitudinal portion 436 where the casing 402 passes through a second formation 438 having a resistance R2. The properties of the first longitudinal portion 432, represented in FIG. 4C by the thickness of first longitudinal portion 432 (although it will be understood that thickness is merely symbolic of the properties and is not necessarily representative of the actual thickness of the first longitudinal portion 432), are chosen so that the magnitude $|Z_{f1}|$ of the impedance of the capacitor in the region of the first longitudinal portion 432 at a chosen frequency of operation ω, computed using equation (2) above, is substantially equal (i.e., within 5 percent, 10 percent, or 25 percent) to |R1|. The properties of the second longitudinal portion 436, represented in FIG. 4C by the thickness of second longitudinal portion 436 (although it will be understood that thickness is merely a symbol of the properties and is not necessarily representative of the actual thickness of the second longitudinal portion 436), are chosen so that the magnitude $|Z_{f2}|$ of the impedance of the capacitor in the region of the second longitudinal portion 436 at a chosen frequency of operation ω, computed using equation (2) above, is substantially equal (i.e., within 5 percent, 10 percent, or 25 percent) to |R2|.

FIG. 5A is a perspective view of a receiver 404. The receiver 404 includes multiple galvanic or capacitive electrodes 500 arranged circumferentially about the casing 402. Any suitable number of electrodes 500 may be used in the receiver 404, and different receivers 404 mounted on a single casing may use different numbers of electrodes 500. The electrodes 500 in a receiver 404 may be arranged in any azimuthal direction(s), as desired. In at least some embodiments, a minimum of five electrodes 500 are used in a single receiver 404, and in at least some such embodiments, the five electrodes 500 are evenly spaced. The electrodes 500 may be of any suitable size and shape, but in at least some embodiments, the electrodes 500 are rectangular and measure six inches long and two inches wide. One or more insulative pads 502 (e.g., ceramic, fiberglass or epoxy resin) may be positioned between electrodes 500 and the underlying casing 402/casing collar 424, thus precluding direct electrical contact between the electrodes 500 and the casing 402/casing collar 424. In some embodiments, the insulative pad 502 has a thickness ranging from 0.05 inches to 0.5 inches, inclusive. The precise thickness of an insulative pad 502 depends at least in part on available annular space between the casing 402 and the borehole wall, as well as the maximum acceptable coupling (i.e., shorting) between the casing 402 and the electrodes 500. In some embodiments, the insulative pad 502 is not necessary because of the presence of the coating of insulating material 428.

In at least some embodiments that include multiple receivers mounted on a single casing 402, the receivers are spaced between 15 and 30 feet apart, inclusive. Receivers may be pre-fabricated in the form of circular or C-shaped collars that are clamped or otherwise coupled to the casing 402 prior to deployment downhole. The receiver 404 couples to a fiber optic sensor 504 that contains a plurality of electro-mechanical (e.g., piezoelectric) transducers that convert voltage signals from the electrodes 500 into optical signals that are provided to a computer (e.g., downhole or at the surface) for processing. More specifically, as potentials are applied to an electro-mechanical transducer, the transducer deforms, thus inducing strain in the optical fiber bonded to that transducer. This strain in the optical fiber can be interrogated at the surface using well-known fiber optic multiplexing and interrogation techniques. The strain is proportional to the applied potential. Similarly, optical signals from different receivers may be differentiated at the surface using known fiber optic multiplexing and interrogation techniques.

In some embodiments, the fiber optic sensor 504 converts electrical energy to a change of phase in the light on a fiber line. In one embodiment, the fiber optic sensor 504 is a lead zirconate titanate (PZT) piezo-electric material with fiber-optic cable wound around it. Electrical voltage applied on the PZT by the receiver electrodes is translated into optical phase through the tightening and relaxation of the fiber. In another embodiment, the transducer is a LiNbO3 phase modulator. The receiver electrodes are connected across the LiNbO3. The variation of refractive index in the LiNbO3 is proportional to the differential voltage, which is in turn proportional to the optical phase change in the light traveling through LiNbO3. The change of phase across the PZT or the LiNbO3 is interrogated at the surface using appropriate and well known interrogation techniques such as intrinsic Fabry Perot, Michelson or Mach Zehnder interferometry.

In some embodiments, the components outside of the casing 402—including the electrodes 500, the insulative pad 502, the sensor 504, and the connection wires 506—are disposed in a cement sheath adjacent to the casing 402. The various receiver properties and parameters described above (including electrode and insulative pad parameters) are not limited to application in the embodiments depicted in FIG. 5A. On the contrary, they may apply to any of the receiver embodiments described in this disclosure.

FIG. 5B includes a top-down, cross-sectional view of a receiver 404. The receiver 404 includes insulative pad 502 disposed about the circumference of the casing 402. The insulative pad 502 may not be necessary because of the presence of the layer of insulating material 428. Six electrodes 500a-500f are positioned on the insulative pad 502 and are evenly spaced from each other. Each of the electrodes 500a-500f couples to a connection wire 508a-508f. A connection wire 508g couples to the casing 402.

FIG. 5B also includes a schematic diagram of the contents of a fiber optic sensor 504, and it depicts the manner in which the connection wires 508a-508g couple to the transducers housed within the sensor 504. The fiber optic sensor 504 includes a package 510 (e.g., made of insulative material, such as ceramic or epoxy resin) that houses transducers 512a-512f Each of the transducers couples to the connection wire 508g, which, in turn, couples to the casing 402. Each of the transducers also couples to a different one of the connection wires 508a-508g, which, as explained, couple to different electrodes 500. Thus, for example, transducer 512a couples to the casing 402 and electrode 500a; transducer 512b couples to the casing 402 and the electrode 500b; transducer 512c couples to the casing 402 and electrode 500c, and so forth. The transducers 512a-512f couple to fiber optic cable 514. Each of the transducers 512a-512f is deformed by the differential potentials applied to it by the connection wires to which it couples, thus modifying the optical signal passing through that transducer. These optical signals are carried through the fiber optic cable 514 to suitable processing logic, such as a downhole or surface computer, for analysis. The processing logic is capable of differentiating and interpreting the various transducers' signals using well-known fiber optic multiplexing and interrogation techniques. The detailed operation of the transducers 512a-512f, the fiber optic signals, and the signal multiplexing performed at a downhole or surface computer will be known to those of ordinary skill in the art.

Operation is now described with regard to FIGS. 4A-5B. The current source 406 injects current into the casing 402 via the excitation electrode 408. Current flows down the casing 402 and is capacitively injected into the formation 412 through the coating of insulating material 428. Electrodes 500a-500f provide potentials to corresponding transducers 512a-512f through connection wires 508a-508f, with each of the transducers 512a-512f coupling to a different electrode. The potential present at the casing 402 is provided to each of the transducers 512a-512f, essentially making the casing 402 a "reference" point with respect to which the potential at each of the electrodes is measured. The transducers 512a-512f modify the optical signals passing through them in accordance with the potentials between the casing 402 and each of the electrodes 500a-500f. The optical signals are then provided to a computer for processing as described further below.

Figure 5C:
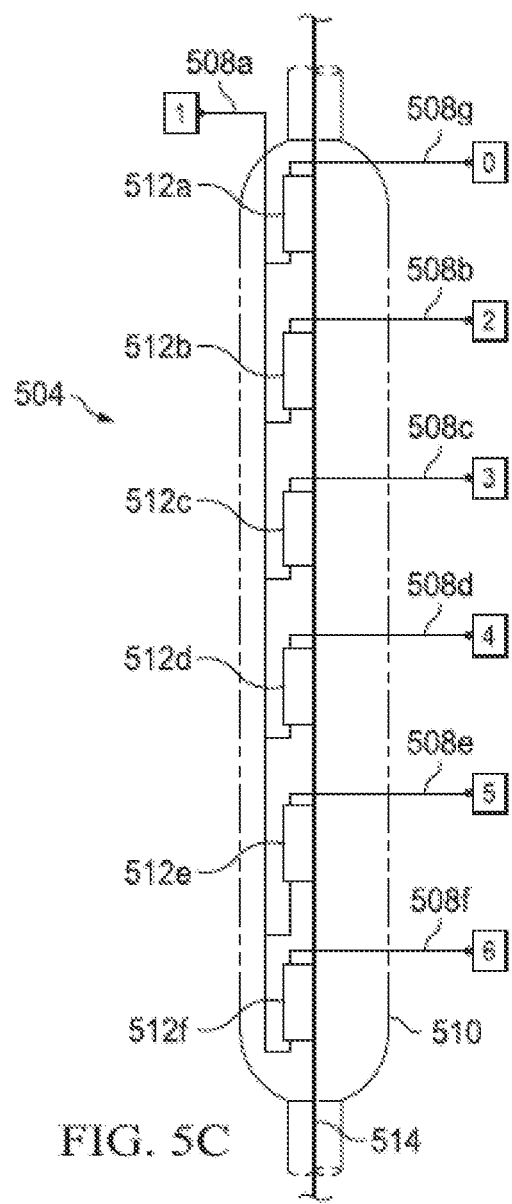
FIG. 5C is a schematic diagram of transducers disposed within a fiber optic sensor and coupled to a receiver according to a second arrangement.

FIG. 5C is a schematic diagram of the fiber optic sensor 504 with an alternative transducer-electrode coupling configuration. In the configuration of FIG. 5B, all of the transducers are coupled to the casing 402, which was used as a reference point for the potentials across the electrodes 500a-500f. In this way, each measured potential was between the casing 402 and a different electrode 500a-500f. By contrast, in the configuration of FIG. 5C, one of the electrodes 500a-500f is used as a reference point in lieu of the casing 402, meaning that the potential at each electrode is measured with respect to the reference point electrode. In FIG. 5C, the sensor 504 includes a package 510 inside which are housed multiple transducers 512a-512f. All of the transducers 512a-512f couple to the reference electrode 500a via connection wire 508a. In addition, the transducers 512b-512f couple to the electrodes 500b-500f, respectively, via connection wires 508b-508f, respectively. Transducer 512a couples to the casing 402 via connection wire 508g. Thus, the transducers 512b-512f are used to measure potentials between the reference electrode 500a and the remaining electrodes 500b-500f, respectively, while the transducer 512a is used to measure the potential between the reference electrode 500a and the casing 402. The data is then processed as described below. In some embodiments, the transducer 512a—which couples to the casing 402—bonds to a separate fiber optic cable than the cable to which the remaining transducers bond. In this way, the differential measurements associated with transducers 512b-512f do not experience the masking effect produced by the absolute potential of transducer 512a.

Figure 5D:
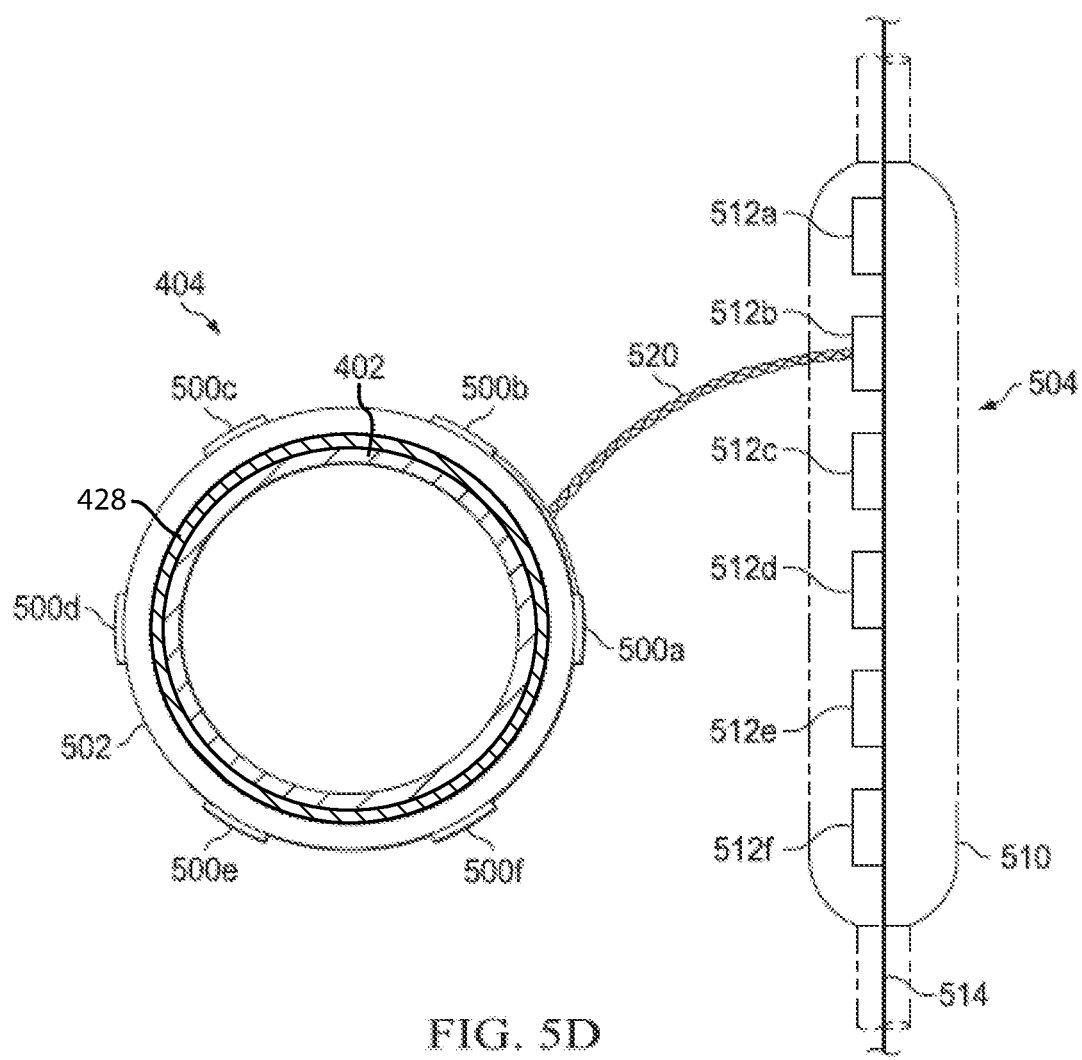
FIG. 5D is a schematic diagram of transducers disposed within a fiber optic sensor and coupled to a receiver according to a third arrangement.

FIG. 5D is a schematic diagram demonstrating a practical wiring between electrodes and the transducers. Specifically, as shown in prior figures, FIG. 5D includes the sensor 504 having a package 510 that houses transducers 512a-512f, which, in turn, couple to fiber optic cable 514. Each of the transducers 512a-512f couples to a different pair of electrodes 500a-500f, or to an electrode and the casing 402. An illustrative wiring configuration is shown in which electrodes 500a-500b couple to transducer 512b via twisted connection wires 508a-508b. The use of twisted wires minimizes crosstalk. Although other twisted wire pairs are not specifically shown in FIG. 5D, any two points in the receiver 404 (e.g., electrode, casing) may be coupled to a transducer using twisted wire pairs. In addition, the scope of disclosure is not limited to the use of twisted wire pairs. Any suitable technique for connecting wires as necessary between electrodes, casing, and transducers may be implemented.

Figure 5E:
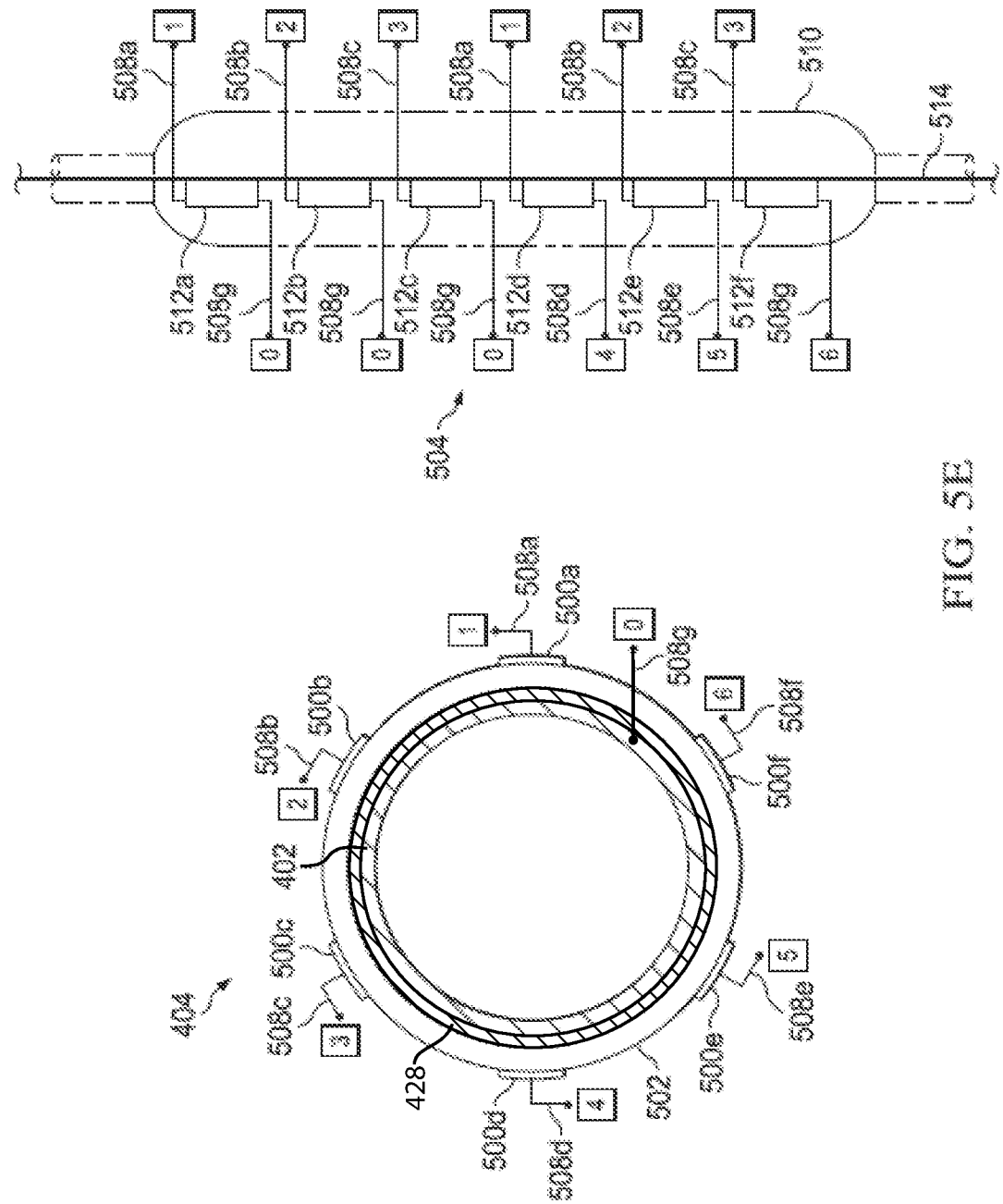
FIG. 5E is a schematic diagram of transducers disposed within a fiber optic sensor and coupled to a receiver according to a fourth arrangement.

FIG. 5E is a schematic diagram of an alternative transducer-electrode coupling configuration. Specifically, FIG. 5E shows the transducers 512a-512f housed within the package 510 of the fiber optic sensor 504. Some of the transducers 512a-512f are used to measure absolute potentials (e.g., potentials between the casing 402 and one or more of the electrodes 500a-500f) and some of the transducers 512a-512f are used to measure differential potentials (e.g., potentials between individual electrodes 500a-500f). In the particular embodiments depicted in FIG. 5E, transducer 512a is used to determine an absolute potential between electrode 500a and the casing 402 using connection wires 508a and 508g, respectively; transducer 512b is used to determine an absolute potential between electrode 500b and the casing 402 using connection wires 508b and 508g, respectively; transducer 512c is used to determine an absolute potential between electrode 500c and casing 402 using the connection wires 508c and 508g, respectively; transducer 512d is used to determine a differential potential between electrodes 500a and 500d using the connection wires 508a and 508d, respectively; transducer 512e is used to determine a differential potential between electrodes 500b and 500e using the connection wires 508b and 508e, respectively; and transducer 512f is used to determine a differential potential between electrodes 500c and 500f using the connection wires 508c and 508f, respectively. Although the embodiments depicted in FIG. 5E include differential potentials that are limited to electrodes spaced 180 degrees apart on the casing 402, differential potentials may be measured using any set of electrodes. In addition, in some embodiments, the transducers 512a-512c—which couple to the casing 402—bond to a separate fiber optic cable than the cable to which the remaining transducers bond. In this way, the differential potentials associated with transducers 512d-512f do not experience the masking effect produced by the absolute potentials of transducers 512a-512c. Measurements are processed as described further below.

Figure 6A:
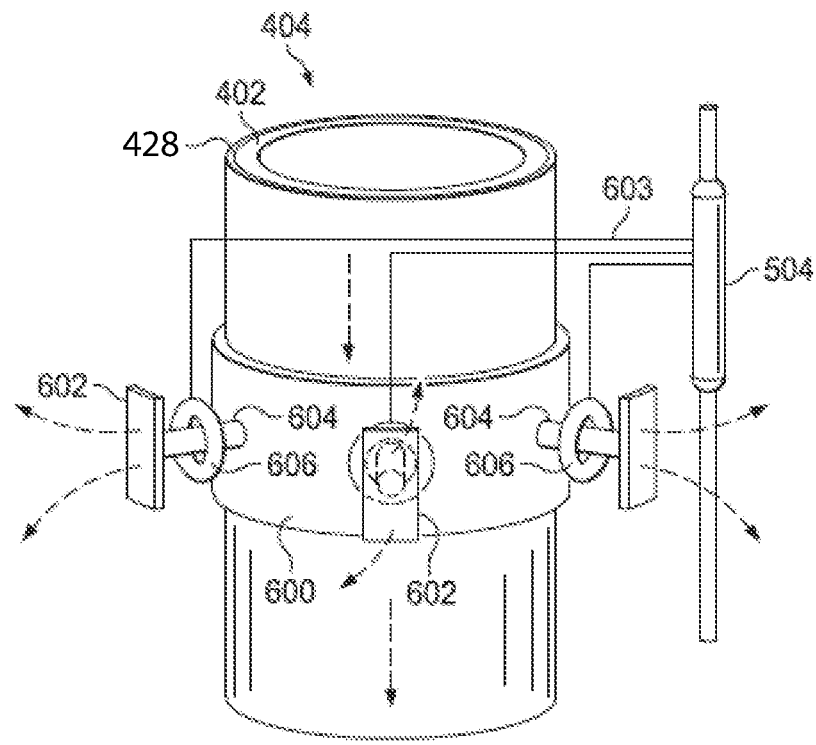
FIG. 6A is a perspective view of a toroidal receiver disposed on a casing and a fiber optic sensor associated with the receiver.

FIG. 6A is a perspective view of a toroidal receiver 404 disposed on a casing 402 and including a fiber optic sensor 504. In such embodiments, the receiver 404 includes multiple electrodes 602 that couple to a casing collar 600 (or, in some embodiments, another part of the casing 402) using conductive arms 604. In at least some embodiments, the electrodes 602 are generally the same or similar to the electrodes 500 in terms of shape and size. The conductive arms 604 may be of any suitable shape, but in at least some embodiments, the arms are cylindrical. The lengths of the conductive arms 604 may be varied as desired, but in at least some embodiments, the lengths range between 0.5 inches and 12 inches, inclusive. The diameters of the arms 604 may be varied as desired, but in at least some embodiments, the diameters range between 0.25 inches and 3 inches, inclusive. Disposed on each of the conductive arms 604 is a dual-terminal toroid 606. The terminals of the toroid 606 (shown in greater detail in FIG. 6B) couple to the fiber optic sensor 504 via connective wires 603. In at least some embodiments, the coating of insulating material 428 is applied to one or more of the casing 402, the casing collar 600, and the conductive arms 604. In some embodiments, such as are discussed below in connection with FIGS. 6C and 6D, the conductive arms 604 and toroids 606 are housed within an insulative package to protect the arms and toroids from damage during deployment downhole.

Still referring to FIG. 6A, in operation, current is applied to the casing using an excitation electrode. In at least some embodiments, the current is a high frequency alternating current (i.e., having a frequency greater than 100 kHz range, greater than 500 kHz, or greater than 1 MHz). The casing 402, conductive arms 604, electrodes 602, and the coating of insulating material 428 provide capacitive coupling of the high frequency alternating current into the surrounding formation. Resistivity changes in the formation caused by water floods affect the amount of current flowing through the electrodes 602 (and the electrodes' conductive arms 604). Current flow through electrodes 602 located closer to the water flood (i.e., oriented closer to the azimuthal direction of the water flood) will be impacted to a greater degree than will current flow through electrodes 602 located farther away from the water flood (i.e., oriented farther away from the azimuthal direction of the water flood). Thus, measurement of the degree of current flow through the electrodes 602 provides information about the water flood location. Accordingly, the toroids 606 are used to monitor current flow through the conductive arms 604 (which is identical or nearly identical to current flow through the corresponding electrodes 602). The potential across each toroid's terminals varies based on the current flow through the conductive arm 604 to which that toroid couples. Thus, potentials across the toroids' terminals can be used to determine water flood location. The potentials are processed as described below.

Figure 6B:
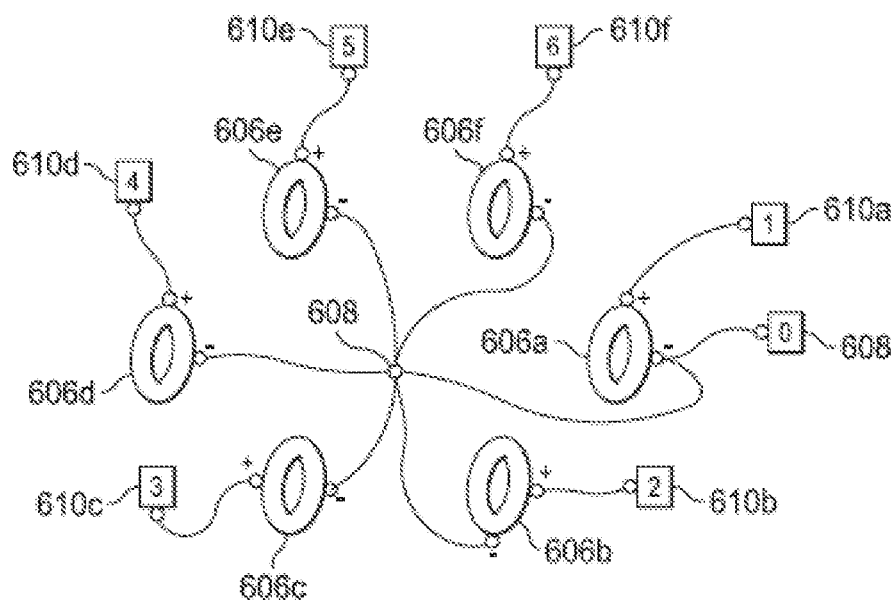
FIG. 6B is a schematic diagram of toroids usable in a toroidal receiver disposed on a casing.

FIG. 6B is a schematic diagram of a toroid-to-transducer coupling scheme. Toroids 606a-606f couple to conductive arms 604 (as shown in FIG. 6A). Each of the toroids has a positive and a negative terminal. In some embodiments, such as those shown in FIG. 6B, connection wires 610a-610f couple to the positive terminals of the toroids 606a-606f, respectively. In other embodiments, connection wires 610a-610f couple to the negative terminals of the toroids 606a-606f, respectively. In some embodiments, such as those depicted in FIG. 6B, a connection wire 608 couples to the negative terminals of the toroids 606a-606f, while in other embodiments, the connection wire 608 couples to the positive terminals of the toroids 606a-606f. The connection wires 608 and 610a-610f couple to transducers using any of the coupling schemes shown in FIGS. 5B-5E, although the scope of disclosure is not limited as such. (Proper coupling between the transducers of FIGS. 5B-5E and the connection wires 608, 610a-610f of FIG. 6B may be determined with reference to the connection reference numerals 0-6 shown in these figures, with the exception of FIG. 5D, the purpose of which is simply to demonstrate the use of twisted wire pairs.) Other coupling configurations are contemplated and included within the scope of this disclosure. In embodiments where the casing 402 is used as a reference point for measuring potentials, the connection 608 may couple to the casing 402 in addition to the couplings shown in FIG. 6B.

Figure 6C:
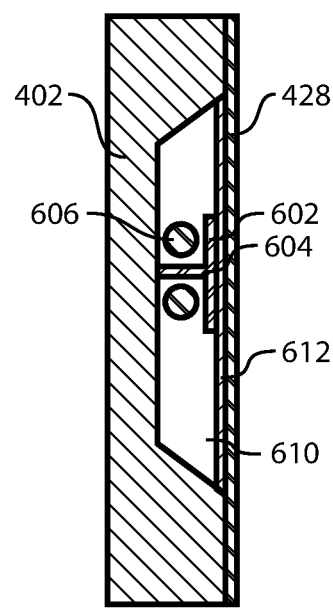
FIG. 6C is a cross-sectional view of one wall of a casing with a toroidal receiver recessed into a cavity in the casing wall, the toroidal receiver covered by a flat cap, and a coating of insulating material over the cap.

FIG. 6C is a cross-sectional view of one wall of a casing with a toroidal receiver recessed into a cavity in the casing wall, the toroidal receiver covered by a flat cap, and a coating of insulating material over the cap. The electrodes 602, the conductive arms 604, and the toroids 606 are located in a cavity 610 in a wall of the casing 402. A flat cap 612 seals the cavity 610 and the coating of insulative material 428 covers the flat cap 610. The electrodes 602 are in electrical and mechanical contact with the flat cap 612.

Figure 6D:
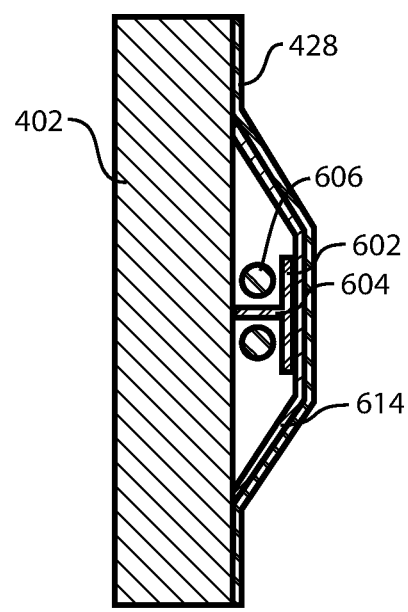
FIG. 6D is a cross-sectional view of one wall of a casing with a toroidal receiver extending from the casing wall, the toroidal receiver covered by a domed cap, and a coating of insulating material over the cap.

FIG. 6D is a cross-sectional view of one wall of a casing with a toroidal receiver extending from the casing wall, the toroidal receiver covered by a domed cap, and a coating of insulating material over the cap. The electrodes 602, the conductive arms 604 and the toroids 606 extend from the surface of the casing 402. A domed cap 614 covers the electrodes 602, the conductive arms 604, and the toroids 606. The coating of insulative material 428 covers the domed cap 614. The electrodes 602 are in electrical and mechanical contact with the domed cap 614.

Figure 7:
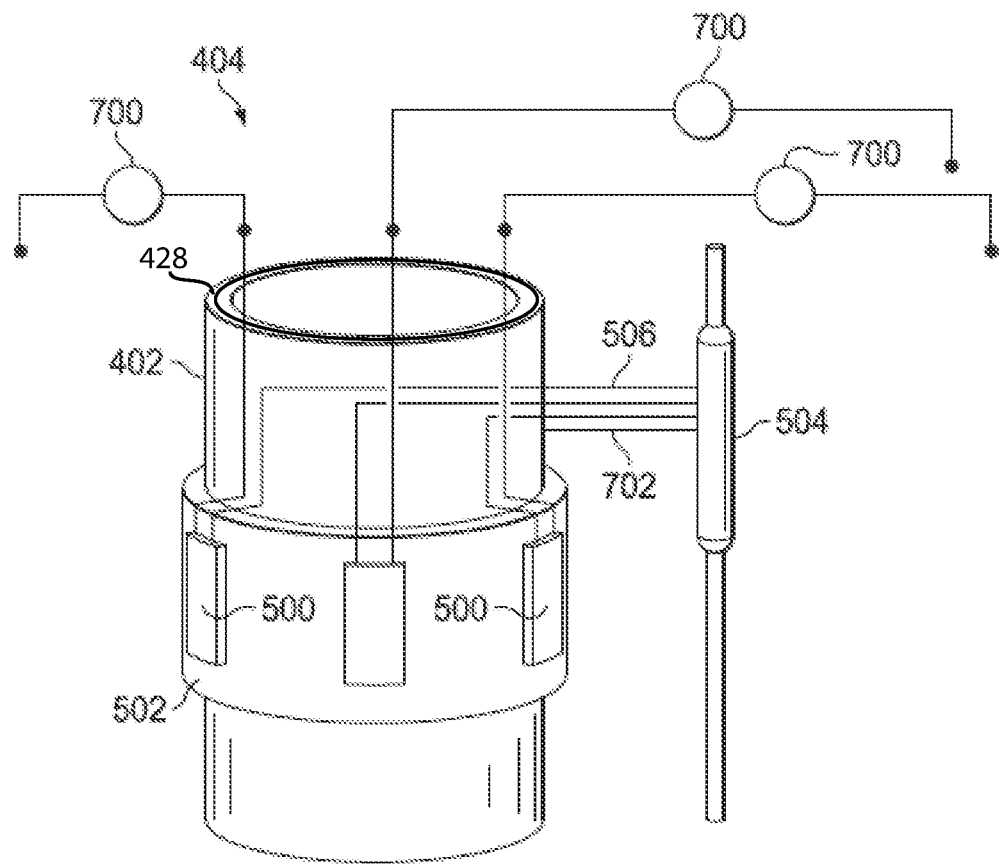
FIG. 7 is a perspective view of an alternative receiver disposed on a casing and a fiber optic sensor associated with the receiver.

FIG. 7 is a perspective view of alternative embodiments of the receiver 404. Specifically, the receiver 404 includes electrodes 500 that are disposed on the casing 402 with the insulative pad 502 positioned between the electrodes and the casing, as shown in FIG. 5A, for example. In some embodiments, the insulative pad 502 is not necessary because of the presence of the coating of insulating material 428. The electrodes 500 couple to the fiber optic sensor 504 via connection wires 506. Unlike the embodiments described above, however, the electrodes 500 in the embodiments depicted in FIG. 7 couple directly to one or more current sources 700. The current source(s) 700 inject current into the formation within which the casing 402 is disposed via the electrodes 500. Thus, in such embodiments, the casing 402 is not excited for purposes of the water flood location identification techniques described herein. In some such embodiments, a single current source 700 couples to all of the electrodes 500, while in other such embodiments, a single current source 700 couples to one or more electrodes 500 but fewer than all electrodes 500. In some such embodiments, multiple current sources 700 may couple to a single electrode 500. In some embodiments, a single current source is successively coupled to the various electrodes 500. Any suitable number and configuration of current sources may be used, but in preferred embodiments, the currents injected through the electrodes 500 are equal. Once current is injected into the formation via the electrodes 500, the potentials at the electrodes 500 are measured with respect to the casing 402 using the connection wires 506, transducers housed within the fiber optic sensor 504, and a wire 702 that couples the casing 402 to each of the transducers within the sensor 504. The specific electrode-to-transducer coupling scheme used may be selected from any of the schemes described above, or a different coupling scheme may be used.

In some embodiments, the casing 402 is used as an electrode with capacitive coupling across the coating of insulating material 428 to the formation as shown in FIGS. 4A-6D in addition to the direct coupling of the electrodes 500 to the one or more current sources 700 as shown in FIG. 7. In such embodiments, the casing 402, individual electrodes 500, or groups of electrodes 500 may be selectively used, alone or in combination, to couple current to the formation.

The description of FIGS. 4A-7 provided above explains the various techniques by which potentials may be measured in accordance with embodiments. The measurements are provided via fiber optic cables to computers located either downhole or at the surface (hereinafter referred to as "the computer" for brevity), examples of which are provided in FIGS. 1-3 (e.g., surface computer 216 in FIG. 2). There, the various potentials from the different transducers associated with the different receivers are differentiated using well-known multiplexing and interrogation techniques. FIGS. 8-13C and the remainder of this description explain how the differentiated potentials are subsequently processed and used to identify water flood locations.

Figure 8:
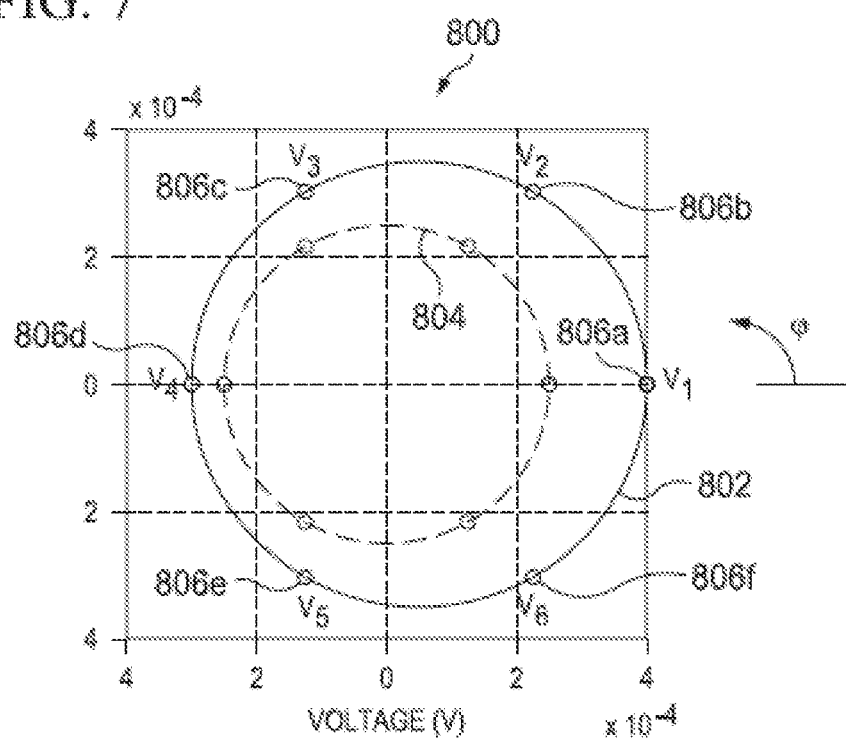
FIG. 8 is a polar plot of potentials measured using casing-mounted receivers.

FIG. 8 is a polar plot 800 of potentials measured using a casing-mounted receiver at a single depth. The plot 800 is based on a variable angle $\phi$, which indicates the azimuthal orientation at which a particular potential is measured. The polar plot may be auto-generated by the computer or manually generated by a user. The plot 800 includes curves 802 and 804. Curve 802 is generated using the potentials received from the fiber optic sensor 504 in case of a flood. Curve 804 is a baseline "no flood" curve against which the curve 802 is compared to determine the presence and position of a water flood. As shown, the curve 802 includes data points 806a-806f. Data point 806a, for instance, is obtained from an electrode (or toroid) having an azimuthal orientation of $\phi$=0 degrees, while data point 806d is obtained from an electrode (or toroid) having an azimuthal orientation of $\phi$=180 degrees. In this way, each of these data points is a potential associated with a different electrode (or toroid). Referring to FIG. 5B, for example, the data points 806a-806f may correspond to potentials at electrodes 500a-500f, respectively. The plot 800 is representative of potentials for a single receiver 404 at a single depth. Separate plots may be generated for each receiver in the case that multiple receivers are used on a single casing—for example, as shown in FIG. 4A.

Still referring to FIG. 8, the scaled voltage from each electrode is plotted as part of curve 802. In a "no flood" situation, the curve 802 will be substantially identical between receivers at differing depths. However, the introduction of a flood alters the formation resistivity, and this effect is more pronounced with increasing proximity to the flood. The potentials measured at the electrodes begin to change as a result of the approaching water flood. The potential associated with the electrode closest to the flood will experience the greatest rise, and the electrode farthest from the flood will experience the least rise in potential. For example, curve 802 in FIG. 8 is asymmetrical (or "deformed"), whereas the "no flood" curve 804 is symmetrical. By comparing the curves 802, 804, it is apparent that the greatest deformation occurs at ϕ angle=0 degrees, which corresponds to an increase in the potential at data point 806a relative to the "no flood" curve 804. Data points 806b and 806f also experience increases in potential relative to curve 804. Data point 806d, by contrast, experiences a lesser degree of change relative to the curve 804. Thus, it may be concluded from the plot 800 that the water flood is located in the ϕ angle=0 degrees direction.

Figure 9:
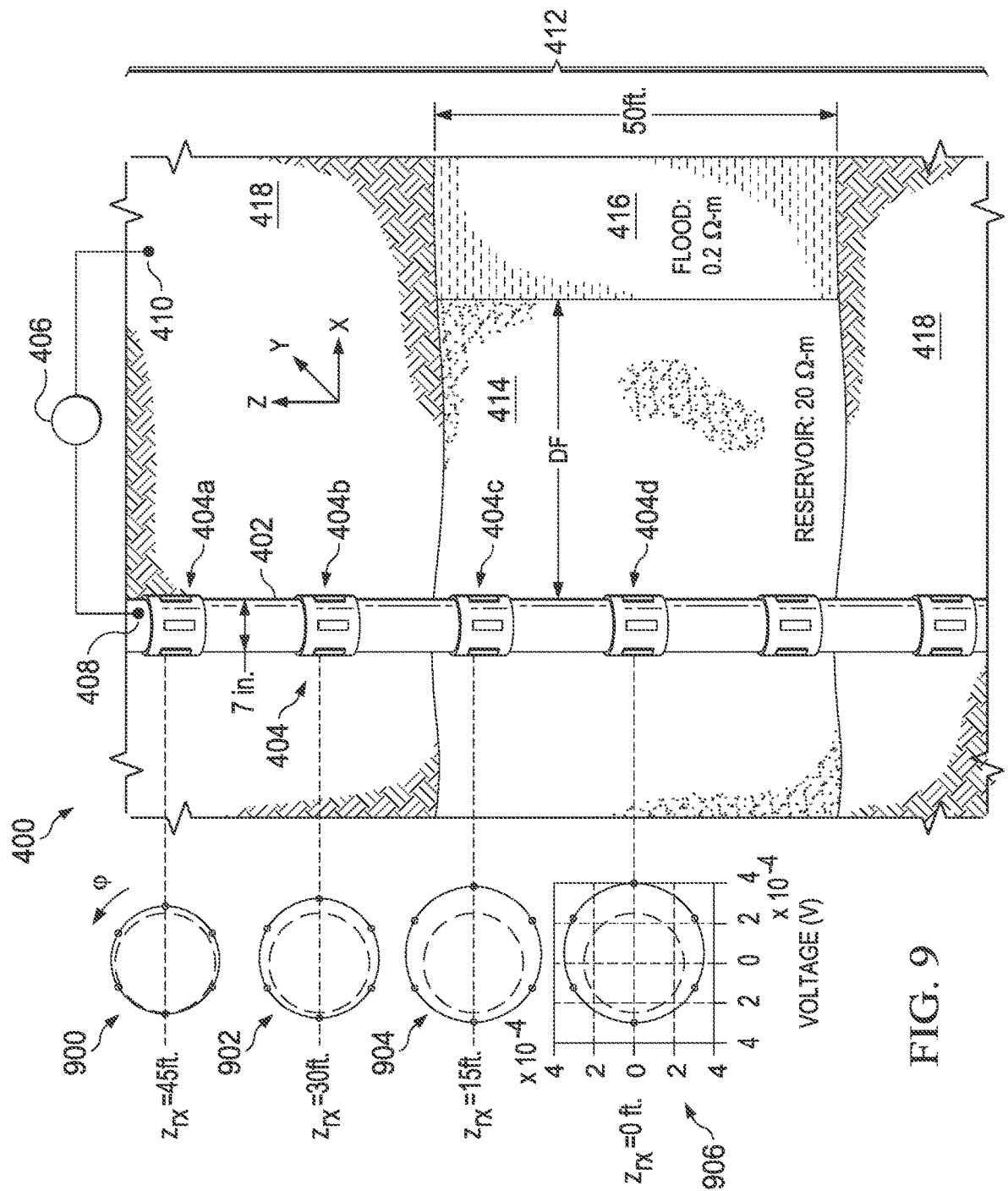
FIG. 9 is a schematic diagram representing water flood monitoring embodiments and corresponding potential polar plots.

The polar plot 800 provides only two-dimensional information with regard to the water flood location. A series of polar plots obtained using potentials from different receivers at different depths provides three-dimensional information regarding the location of the water flood relative to the casing. FIG. 9 is a schematic diagram of a well that includes multiple casing-mounted receivers at differing depths, as well as the potential polar plots associated with four of these receivers. In particular, the environment 400 of FIG. 9 includes multiple receivers 404a-404d mounted upon the casing 402 and spaced approximately 15 feet apart from each other. The current source 406 excites the casing 402 using the excitation electrode 408 and the return electrode 410. The well is disposed in the formation 412, which includes a reservoir 414 having an approximate resistivity of 20 Ohms-meter, the water flood 416 having an approximate resistivity of 0.2 Ohms-meter and an approximate depth of 50 feet, and the shoulder beds 418 having an approximate resistivity of 1 Ohm-meter.

FIG. 9 also includes polar plots 900, 902, 904, 906, which are generated using potentials obtained from receivers 404a-404d, respectively. As shown, the solid curve in plot 900 is coincident with the "no flood" dashed-line curve, meaning that the receiver 404a does not detect the flood 416. The solid curves in plots 902, 904 and 906, however, have potentials at ϕ=0 degrees that progressively enlarge at a greater rate than the potentials at other values for ϕ. The plots in FIG. 9 indicate that not only is the flood 416 located in the ϕ=0 degrees azimuthal direction, but that the flood 416 is closer to the receiver 404d than it is to the receiver 404a. Thus, receivers 404 at multiple depths may be used to obtain three-dimensional information regarding the water flood location.

Figure 10:
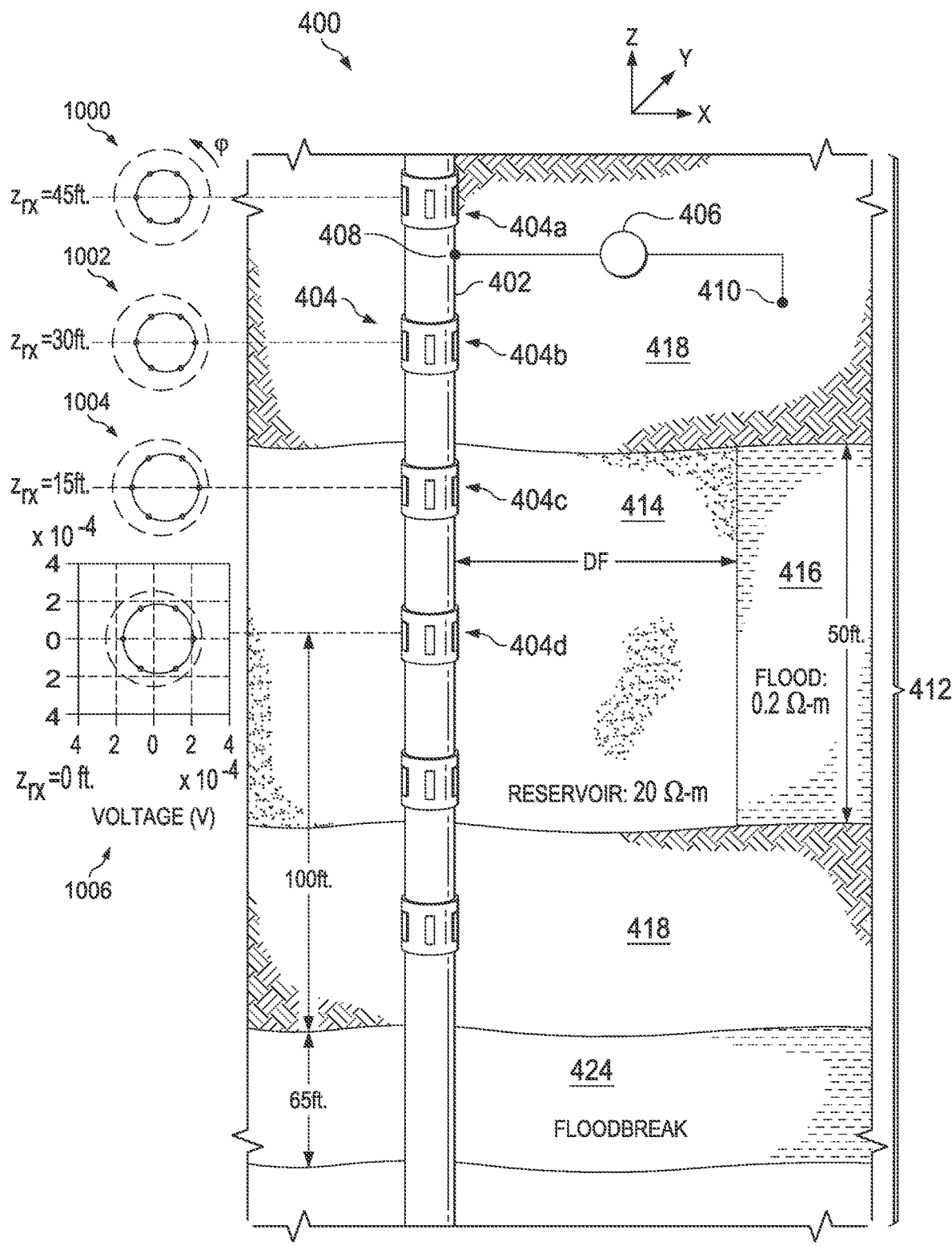
FIG. 10 is another schematic diagram representing water flood monitoring embodiments and corresponding potential polar plots.

FIG. 10 is a schematic diagram of a well that includes multiple casing-mounted receivers at differing depths, as well as the potential polar plots associated with four of the receivers. FIG. 10 is similar to FIG. 9, but the two figures differ in that the environment 400 of FIG. 10 includes a flood break through 424 below the lower shoulder bed 418, resulting in polar plots 1000, 1002, 1004, 1006 that differ from the polar plots of FIG. 9. Specifically, because the flood break through 424 is in contact with the casing 402, a substantial portion of the current flowing through the casing 402 leaks into the flood break through region. As a result, the signal strength shown in the polar plots is significantly attenuated in comparison to the polar plot signal strengths shown in FIG. 9, which contains no flood break through. The behavior of the solid curve in the polar plots of FIG. 10 relative to the dashed baseline curve, however, is still similar to the behavior of the solid curve in the polar plots of FIG. 9—that is, the flood is located in the azimuthal direction ϕ=0.

Still referring to FIGS. 9 and 10, the change in the absolute signal strength due to the flood outbreak 424 makes estimation of the distance to flood using absolute potentials a complex task. The geometric factor, however, is substantially insensitive to changes in the absolute signal strength and can be used reliably to determine distance to flood. FIG. 11 is a geometric factor distribution graph 1100 for the environments 400 shown in FIGS. 9 and 10. The graph 1100 plots geometric factor curves 1102a-1102e, 1104a-1104e for the receivers in FIGS. 9 and 10, respectively. The different curves 1102a-1102e represent different distances to flood, as indicated, and the different curves 1104a-1104e also represent different distances to flood, as indicated. As the curves demonstrate, the geometric factor is virtually unchanged between the environments 400 shown in FIGS. 9 and 10.

Figure 12A:
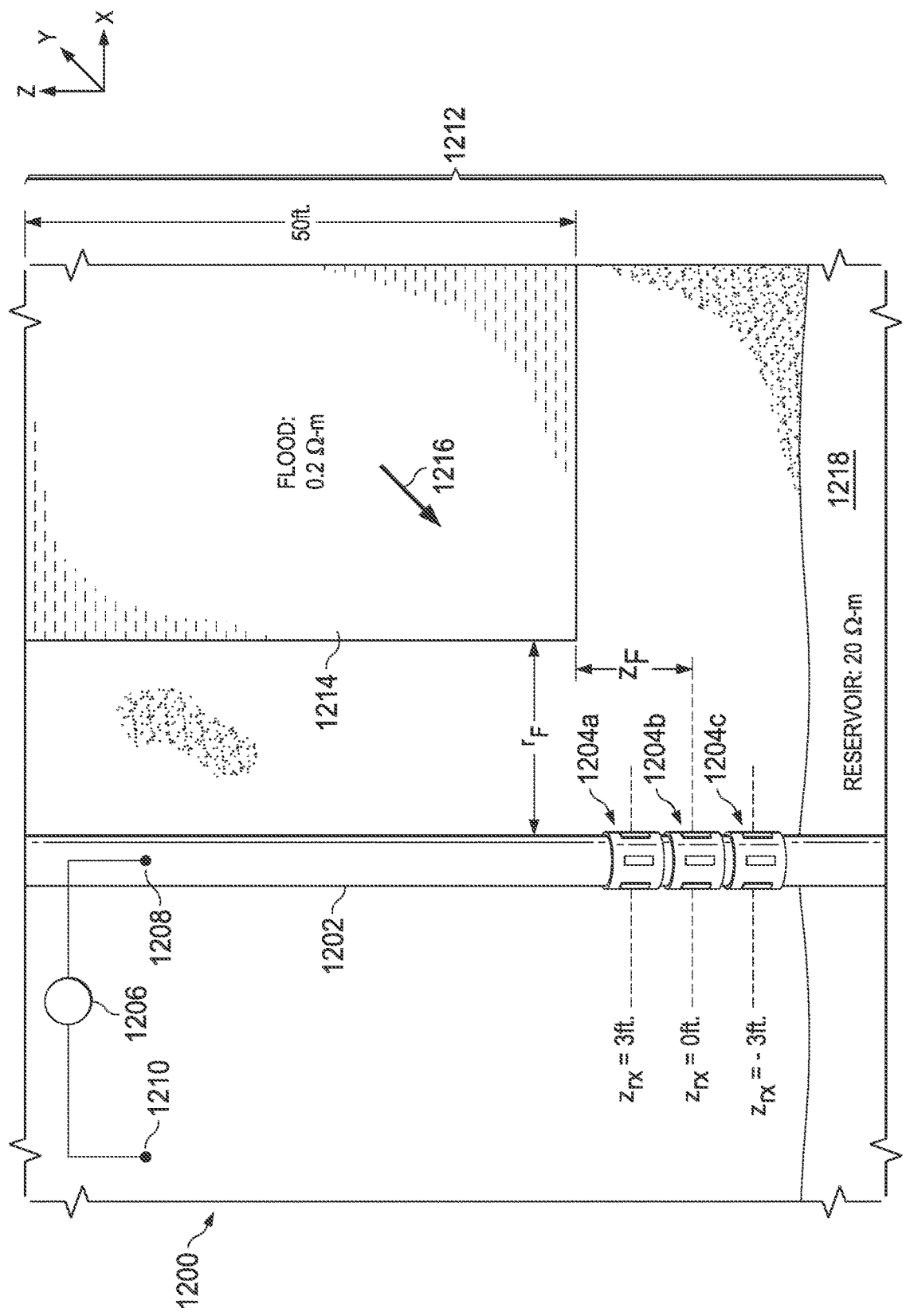
FIGS. 12A-12C are schematic diagrams representing array-based water flood monitoring embodiments.
Figure 12B:
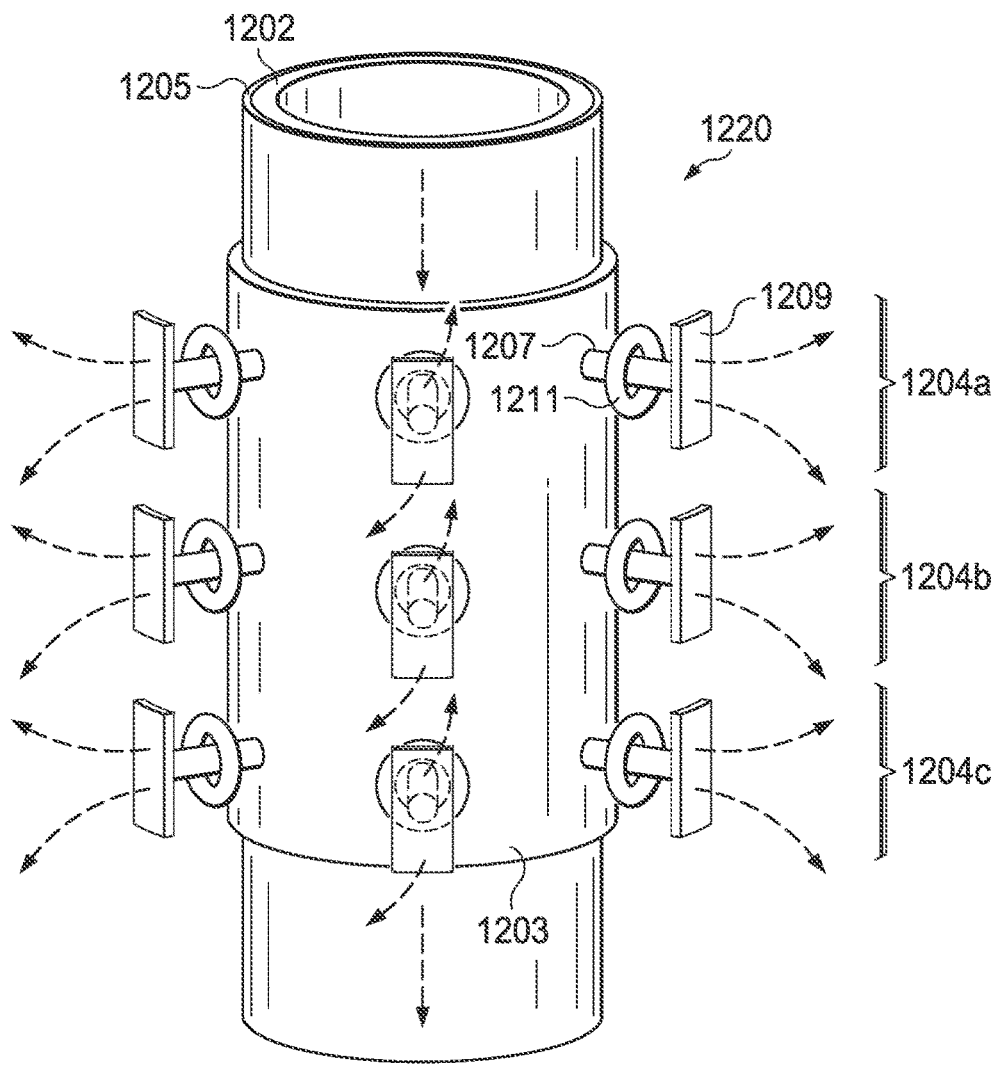
Figure 12C:
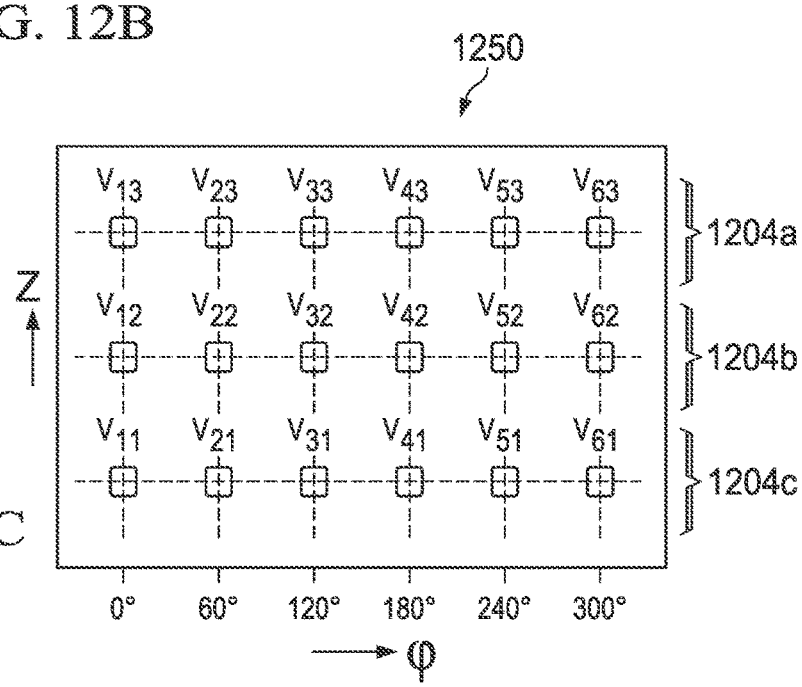

FIGS. 12A-12C are schematic diagrams representing array-based water flood monitoring embodiments. Array-based embodiments include receivers that are positioned closely together (e.g., each receiver is positioned within 5 feet of the next receiver), so that the electrodes on the receivers, when visualized in a two-dimensional format, form an array. Potentials from horizontally coplanar electrodes are processed to determine the azimuth of the flood $\phi_0$, whereas potentials from vertically coplanar electrodes are processed to determine the elevation of the flood $\theta_0$. The geometric factors of both horizontal and vertical measurements may be jointly inverted as explained above using any suitable inversion technique to obtain the radial and axial distances to flood. Array-based embodiments are thus useful for determining the precise location of a water flood.

The environment 1200 in FIG. 12A includes a casing 1202 having receivers 1204a-1204c mounted thereupon, with an inter-receiver spacing of approximately three feet. A current source 1206 excites the casing 1202 using an excitation electrode 1208 and a return electrode 1210. The casing 1202 is disposed in a formation 1212. A water flood 1214 approaches the receivers 1204a-1204c in the direction indicated by the arrow 1216. The water flood 1214 has a resistivity of approximately 0.2 Ohms-meter. A reservoir 1218 having a resistivity of 20 Ohms-meter is situated below the receivers 1204a-1204c. The system 1220 in FIG. 12B has a toroidal configuration similar to that shown in FIGS. 6A-6D. The system 1220 includes a casing 1202, a coating of insulating material 1205 (similar to the coating of insulating material 428 described above in connection with FIGS. 4B, 4C, 6C, and 6D, among others) disposed on one or more of the casing 1202, a casing collar 1203, and conductive arms 1207 that couple the casing 1202 or casing collar 1203 to the electrodes 1209. Toroids 1211 couple to the conductive arms 1207 and, as explained with reference to FIG. 6A, determine potentials based on the flow of current passing through the conductive arms 1207. The electrodes 1209 positioned at the highest depth belong to receiver 1204a; the electrodes 1209 at the lowest depth belong to receiver 1204c; and the electrodes in between the highest and lowest depth are part of receiver 1204b. The operation of the receivers shown in FIGS. 12A and 12B is similar to that of the receivers already described above.

FIG. 12C is an array map 1250 that shows the configuration of the receivers 1204a-1204c from FIGS. 12A and 12B in a two-dimensional format. At an azimuthal orientation of ϕ=0 degrees, potentials $V_{11}$, $V_{12}$ and $V_{13}$ are obtained from receivers 1204c, 1204b and 1204a, respectively; at an azimuthal orientation of ϕ=60 degrees, potentials $V_{21}$, $V_{22}$ and $V_{23}$ are obtained from receivers 1204c, 1204b and 1204a, respectively; and so forth. Potentials from horizontally coplanar electrodes (e.g., $V_{11}$, $V_{21}$, $V_{31}$, $V_{41}$, $V_{51}$, $V_{61}$) are processed as described above to determine the azimuth of the flood $\phi_0$, while potentials from vertically coplanar electrodes (e.g., $V_{11}$, $V_{12}$, $V_{13}$, $V_{41}$, $V_{42}$, $V_{43}$) are processed as described above to determine the elevation of the flood $\theta_0$.

Figure 12D:
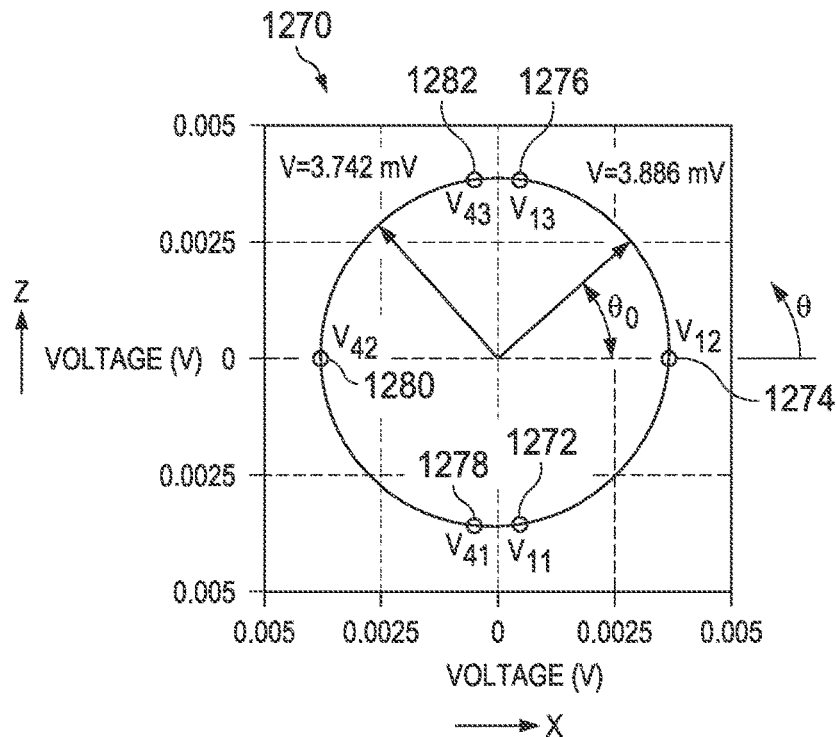
FIGS. 12D-12E are illustrative potential polar plots corresponding to array-based water flood monitoring embodiments.
Figure 12E:
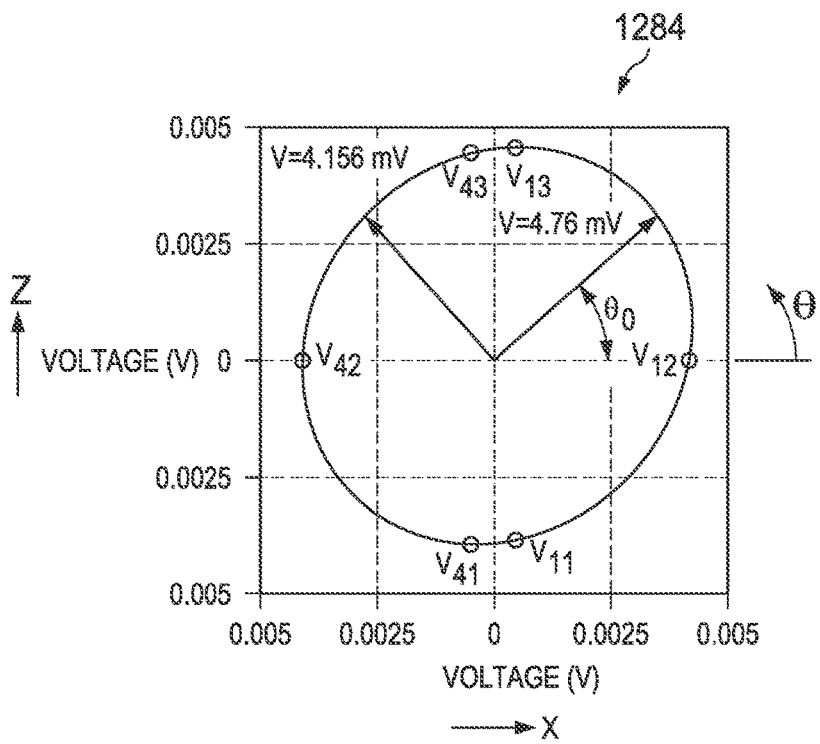

FIGS. 12D and 12E are potential polar plots generated using data collected by the receivers 1204a-1204c. In both of the plots, the azimuthal orientation φ is kept constant at 0 degrees (i.e., the plots represent the φ=0 degrees plane), while the elevation angle θ is varied from 0 to 360 degrees. Specifically, plot 1270 in FIG. 12D assumes that the water flood is in the azimuthal direction of φ=0 degrees and plots the interpolated potentials for all values of elevation angle θ for φ=0. The plot 1270 includes potentials obtained from the electrodes indicated by $V_{11}$ (numeral 1272), $V_{12}$ (numeral 1274), and $V_{13}$ (numeral 1276), as well as potentials obtained from the electrodes indicated by $V_{41}$ (numeral 1278), $V_{42}$ (numeral 1280), and $V_{43}$ (numeral 1282). As the plot 1270 shows, the greatest deformation is present at θ=45 degrees, with an interpolated potential of 3.886 mV and a calculated geometric factor of 0.038. For comparison, the interpolated potential at θ=135 degrees is 3.742 mV. In this example, the plot 1270 is generated when the values for $r_F$ and $z_F$ in FIG. 12A are both 10 feet. Plot 1284 in FIG. 12E includes potentials obtained from the same electrodes as FIG. 12D, with the difference being that in FIG. 12E the water flood is closer ($r_F$ and $z_F$ both are 5 feet) than it is in FIG. 12D. As a result, the interpolated potential at θ=45 degrees is now 4.76 mV and the interpolated potential at θ=135 degrees is now 4.156 mV, resulting in an increasingly apparent deformation near θ=45 degrees. The geometric factor is now 0.145. As explained above, the geometric factor may be inverted to determine the distance to flood in the θ=45 degrees direction.

In summary, regardless of the specific receiver configuration used in a particular environment, a polar plot may be generated using interpolated potentials for all values of φ. The interpolated values are analyzed to identify the largest potential, which corresponds to the area of greatest deformation. The geometric factor is calculated based on the largest potential as described above, and the geometric factor is then inverted to determine the distance to water flood in the corresponding φ direction. Similarly, a polar plot may be generated using interpolated potentials for all values of the θ angle. The interpolated values are analyzed to identify the largest potential, which corresponds to the area of greatest deformation. The geometric factor is calculated based on the largest potential as described above, and the geometric factor is then inverted to determine the distance to water flood in the corresponding θ direction. In this way, the precise location of the water flood is determined.

Figure 13A:
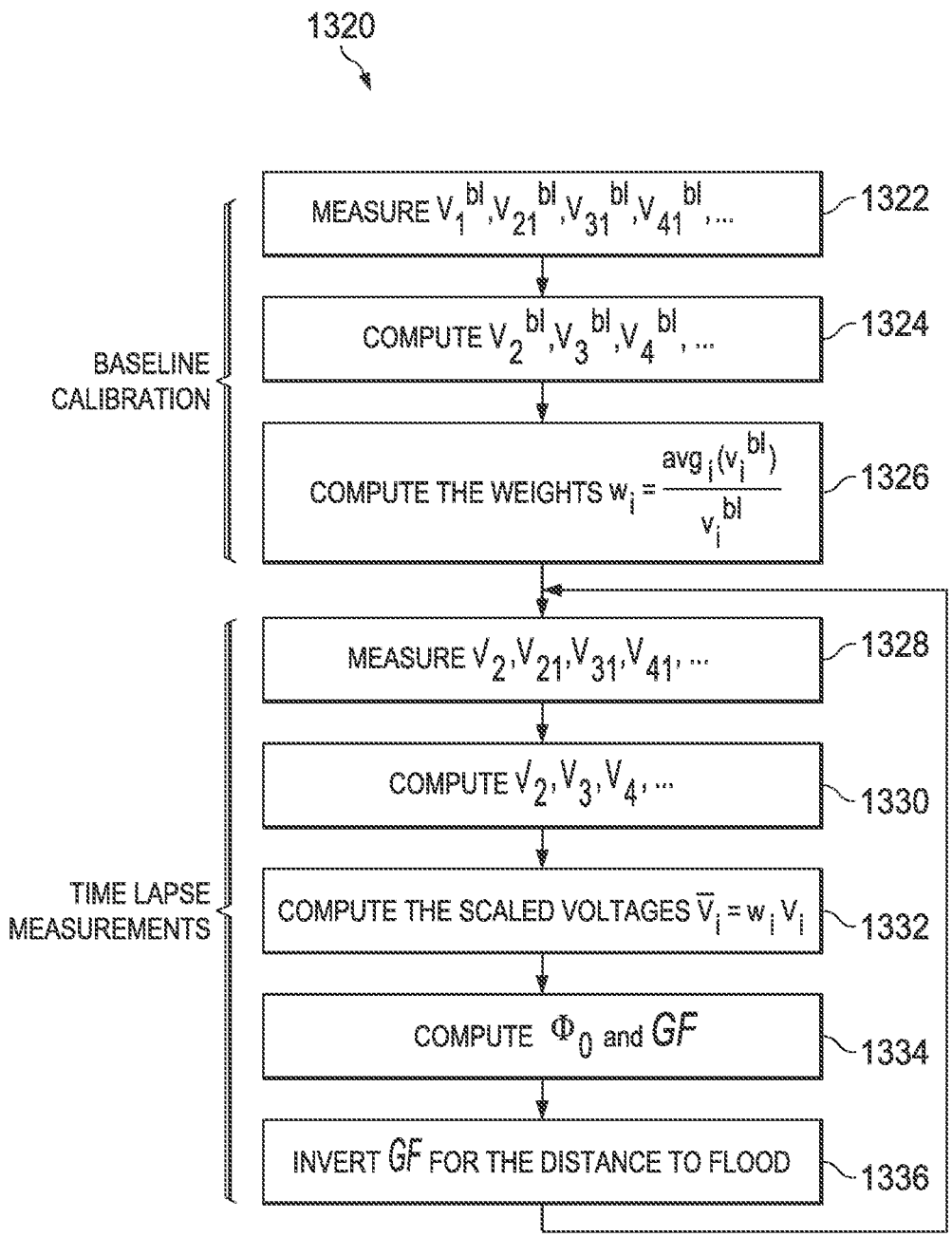
FIG. 13A is a flow diagram of a method usable to perform at least some of the water flood location monitoring techniques described herein.

FIG. 13A is a flow diagram of a method 1320 usable to generate at least some of the polar plots described above and to perform at least some of the water flood location monitoring techniques described herein. First, a baseline calibration is performed. Specifically, a set of baseline differential non-reference potentials (inter-electrode potentials, e.g., such as those described with regard to the embodiments of FIGS. 5C-5E and 6B) are obtained (block 1322). A baseline absolute reference potential of the reference electrode (relative to the casing, e.g., in FIG. 5C, electrode 500a, which couples to the transducers 512a-512f via the connection wire 508a) is mathematically added to the differential non-reference potentials obtained from the non-reference electrodes (e.g., in FIG. 5C, electrodes 500b-500f, which couple to the transducers 512b-512f, respectively, via connection wires 508b-508f, respectively) to obtain the baseline absolute non-reference potential for each non-reference electrode (block 1324). At block 1326, scaling weights are then determined for each azimuthally-oriented receiver as follows:

$$w_i = \frac{avg_i(V_i^{bl})}{V_i^{bl}}, i = 1, \ldots, N \qquad (5)$$

where $V_i^{bl}$ is the i-th baseline absolute non-reference potential, and $avg_i(V_i^{bl})$ is the average over the N potentials. These weights are stored and used to mathematically scale subsequently measured potentials. The baseline calibration is then complete.

At block 1328, differential non-reference potentials are obtained from non-reference electrodes, and at block 1330, the absolute reference potential of the reference electrode is mathematically added to the differential non-reference potentials obtained from the non-reference electrodes as described above with respect to block 1324 to obtain the absolute non-reference potential for each non-reference electrode (block 1330). The absolute non-reference potential for each non-reference electrode is then mathematically weighted at block 1332. In particular, $$\overline{V}_i = w_i \times V_i \qquad (6)$$

where $\overline{V}_i$ is the i-th scaled absolute non-reference potential.

Continuous polar plots of the scaled potentials $\overline{V}(\phi)$ may then be obtained by interpolating the discrete potentials $\overline{V}_i$, resulting in a curve such as solid curve 802 in FIG. 8. The baseline (dashed) curve 804 is generated using the baseline (no flood) potentials described above. As explained, an approaching water flood deforms the scaled potentials. This is due to the increased conductivity associated with water in comparison to reservoir fluids. Thus, the current in the formation is redistributed so that more current is drawn toward the more conductive water flood, resulting in an increase in the measured potentials at the receiver(s) aligned with the flood. Once the polar plot is generated, the largest value of $\overline{V}(\phi)$ is identified as the potential associated with the direction φ of the water flood, as explained above with respect to FIG. 8 (block 1334). The deformation of the scaled azimuthal measurement curve (e.g., curve 802 in FIG. 8) in comparison to the baseline circle (e.g., curve 804 in FIG. 8) may be quantified by a geometric factor GF (block 1334):

$$GF = \frac{\max_\phi(\overline{V}(\phi)) - avg_\phi(\overline{V}(\phi))}{avg_\phi(\overline{V}(\phi))} \qquad (7)$$

Once the geometric factor is calculated, it may be inverted using any suitable technique to determine the distance to flood (block 1336). A parametric functional (or cost function) is formed from the linear combination of a misfit functional and a stabilizing functional. The misfit functional can be formed as the L2 norm of the weighted difference between observed and predicted data. The stabilizing functional can be formed as the L2 norm of the weighted model parameters, and may be inclusive of a priori models and spatial functions. The model parameters are adjusted to minimize the parametric functional. Numerical techniques to achieve this minimization may include deterministic methods (e.g., Gauss-Newton, Levenverg-Marquardt, Steepest Descent, Conjugate Gradients) or stochastic methods (e.g., Markov Chain Monte Carlo, Genetic Algorithms, Simulated Annealing). In addition to a final model, the inversion may generate inversion metrics such as misfit/ error, data uncertainty estimates, and model uncertainty estimates. Inversion techniques may be performed using geometric factor or based on any algebraic function of measurements. It is also possible to use the time-lapse measurement (the difference of a differential or absolute voltage) to make a qualitative assessment of an approaching water flood. In this scenario, a water flood is detected when the time-lapse signal exceeds a certain threshold. In this case, the threshold may be selected based on the observed noise level of the time-lapse measurement when the water flood is far away. For instance, the threshold can be selected to be 2-5 times the maximum noise observed.

Figure 13B:
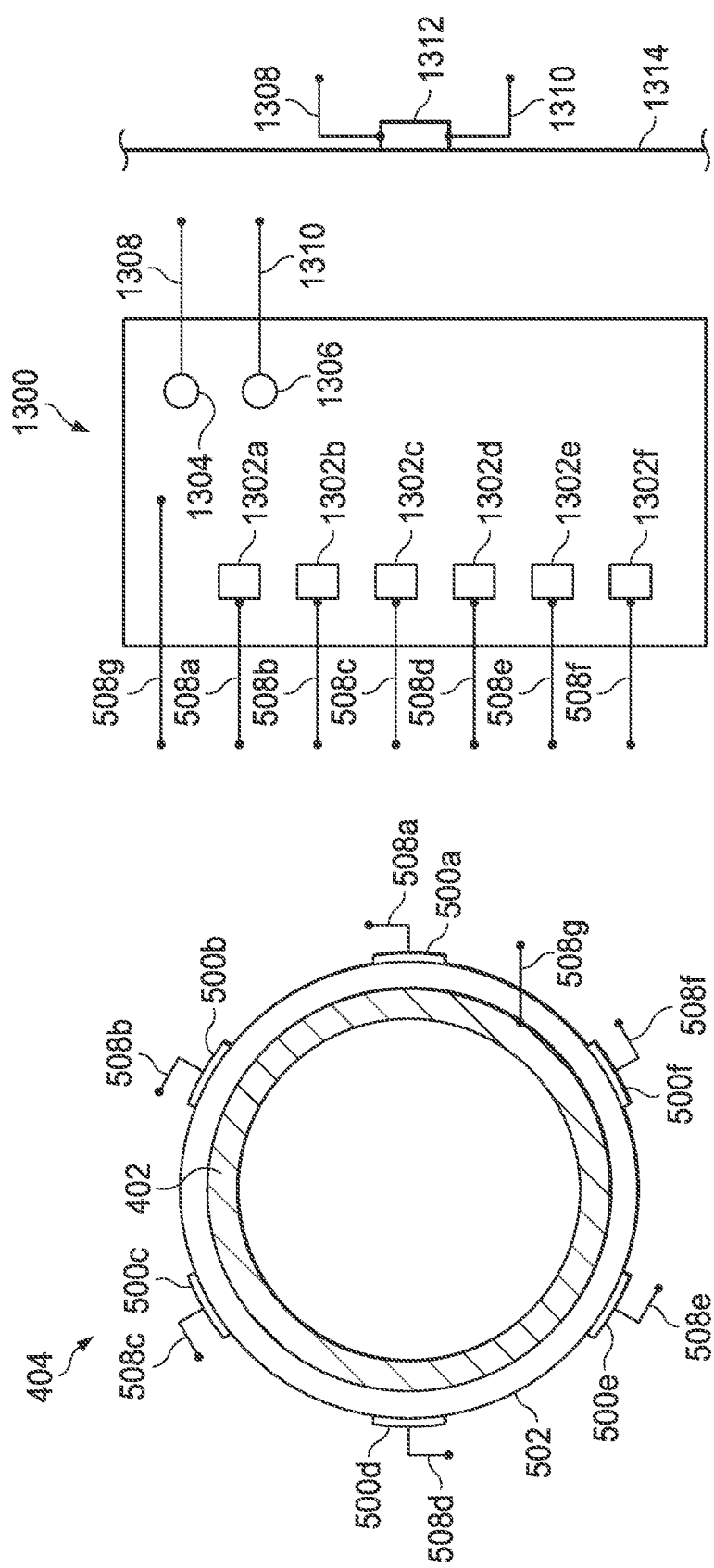
FIG. 13B is a cross-sectional view of a casing-mounted receiver and includes a schematic diagram of a multiplexing control unit for coupling the receiver to a transducer.

At least some of the embodiments described above entail generating normalized potentials by first measuring potentials and then mathematically applying a calculated weight to the measured potentials. In some embodiments, however, weights may be directly applied to signals electrically. FIG. 13B depicts such embodiments, in which a downhole control unit 1300 receives connection wires 508a-508g from the electrodes 500a-500f and the casing 402, respectively. The control unit 1300 may be positioned in, e.g., a wireline sonde, in a drill string bottomhole assembly, in a cement sheath adjacent to a casing, or in any other suitable location. The control unit 1300 includes weight application units 1302a-1302f for connection wires 508a-508f, respectively. Each of the weight application units 1302a-1302f applies a scaling weight to a signal received from a corresponding electrode to produce a scaled signal. The control unit 1300 includes multiple switches (e.g., a number of switches that is a multiple of two) 1304, 1306 that couple to connection wires 1308, 1310, respectively. These switches 1304, 1306 effectively select which of the electrodes 500a-500f will couple to the connection wires 1308, 1310. In some embodiments, the connection wires 1308, 1310 couple to a single transducer 1312 (e.g., housed in a fiber optic sensor) on the fiber optic cable 1314. In other embodiments, a different number of transducers (e.g., precisely two transducers) may be used. The control unit 1300 functions as a multiplexer that uses the switches 1304, 1306 to select which of the connection wires 508a-508g (and, thus, which of the electrodes 500a-500f and/or the casing 402) couples to the transducer 1312. In this way, fewer transducers are required. The switches 1304, 1306 may be controlled in any suitable manner, such as through communications with a surface or downhole computer. The weight application units 1302a-1302f and the switches 1304, 1306 may function independently of each other, meaning that in some embodiments, the weight application units 1302a-1302f are implemented and switches 1304, 1306 are not, and in other embodiments, the switches 1304, 1306 are used and the weight application units 1302a-1302f are not. The transducer 1312, like other transducers described above, determines a potential between the electrodes to which it couples. However, because the transducer 1312 receives scaled signals instead of unweighted signals, it produces scaled potentials. Scaled differential potentials (between electrodes) are used to mathematically determine scaled absolute potentials (relative to casing) which are then used to determine the water flood location, as described below. The configuration shown in FIG. 13B may be implemented in any of the embodiments described herein, as may be suitable.

Figure 13C:
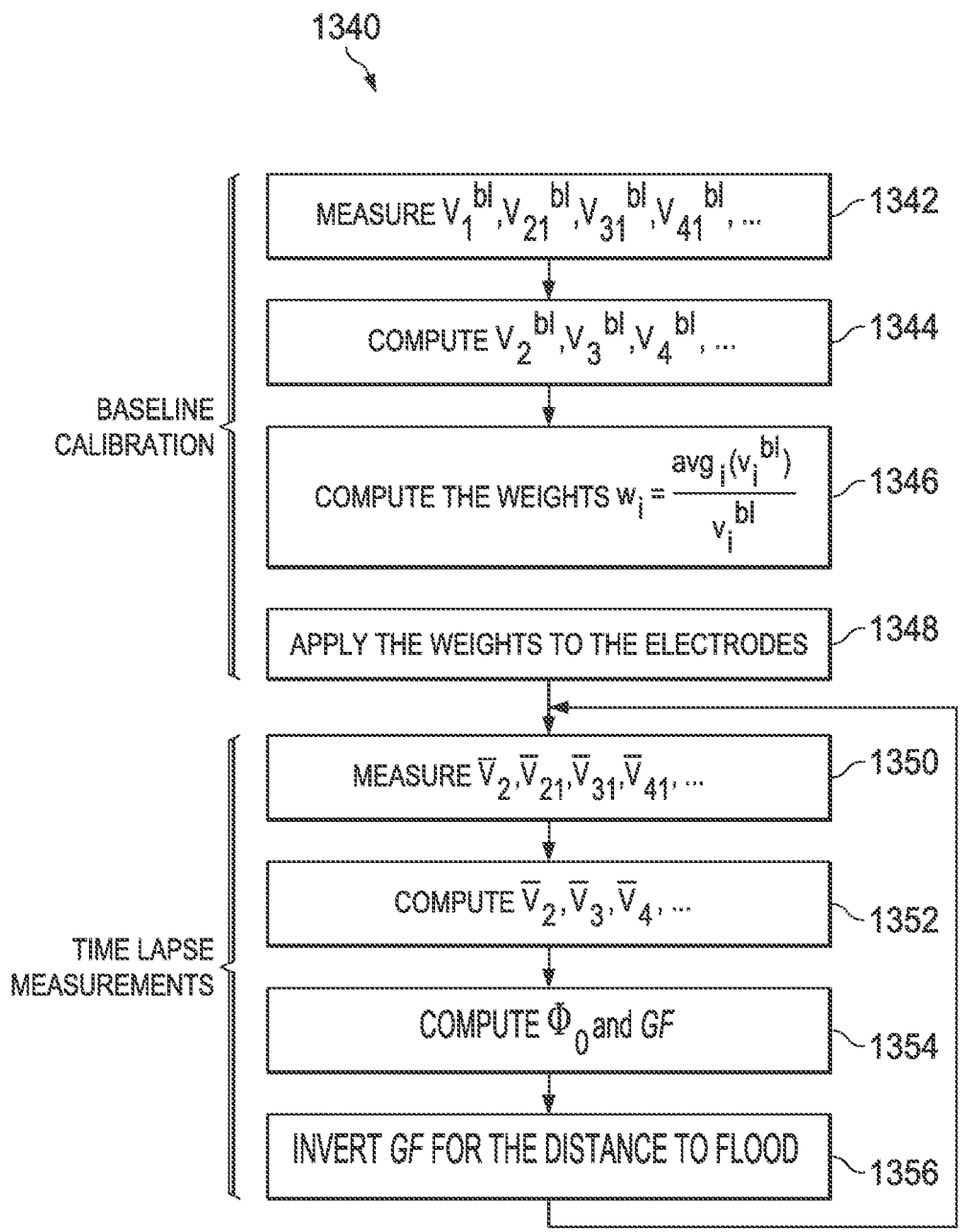
FIG. 13C is a flow diagram of a method usable to perform at least some of the water flood location monitoring techniques described herein.

FIG. 13C is a flow diagram of a method 1340 that may be used in tandem with the embodiments of FIG. 13B to determine water flood location. The method 1340 begins with a baseline calibration process, as with method 1320. The baseline calibration process includes determining a set of baseline differential non-reference potentials (block 1342) and mathematically adding the baseline absolute reference potential of the reference electrode to the baseline differential non-reference potentials to produce baseline absolute non-reference potentials for each of the non-reference electrodes (block 1344). The method 1340 then includes computing weights using the baseline absolute non-reference potentials (block 1346) and applying the weights to weight application units (block 1348), as described above with respect to equation (1) and FIG. 13B. The non-reference electrode(s), weight application unit(s) and transducer(s) (e.g., as in FIG. 13B) are then used to produce scaled, differential non-reference potentials (block 1350). As shown in the flow diagram at block 1350, the differential potentials are already weighted; no additional mathematical weighting is necessary. The method 1340 then includes mathematically adding an absolute reference potential to the scaled differential non-reference potentials to produce scaled absolute non-reference potentials for the various non-reference electrodes (block 1352). The scaled absolute non-reference potentials for the non-reference electrodes are used to generate interpolated polar plots and to determine both the direction of the approaching water flood and a geometric factor, as described above with respect to the method 1320 of FIG. 13A (block 1354). The geometric factor is then inverted to determine a distance to flood (block 1356). As explained above, geometric factors may be calculated using both maximum $\phi$ and $\theta$ values, thus providing distances to flood in both axial and radial directions.

Figure 14A:
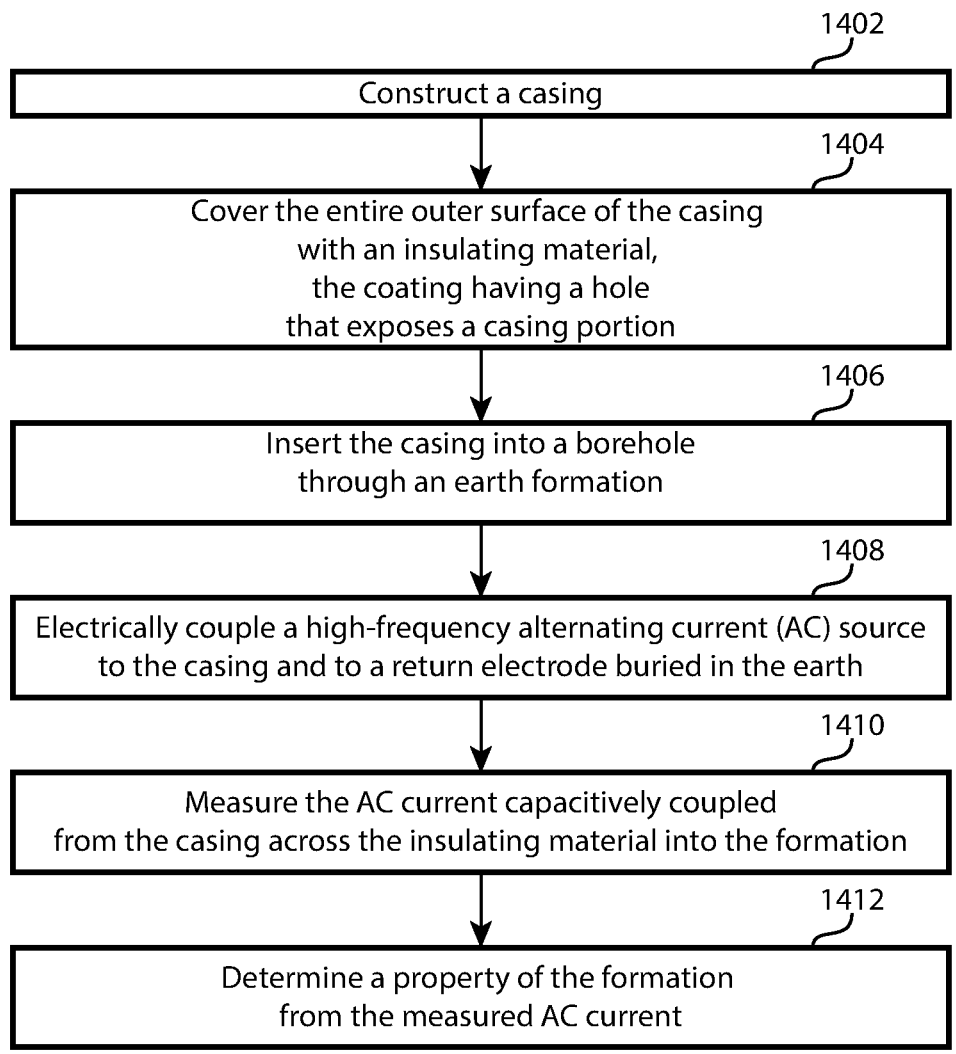
FIG. 14A is a flow diagram of a method usable to perform current injection via capacitive coupling.

FIG. 14A is a flow diagram of a method usable to perform current injection via capacitive coupling. A casing, e.g., casing 402, is constructed by joining a plurality of joints of pipe, e.g., joints of pipe 420, 422, by a plurality of casing collars, e.g., casing collar 424 (block 1402). The casing has an outer surface. The entire outer surface of the casing is covered with a coating of insulating material, e.g., coating of insulating material 428, as it is being constructed (block 1404). It is also possible for the majority of the outer surface of the casing, rather than the entire outer surface, to be covered with the coating of insulating material 428. This would not be ideal, however, since some of the currents would leak out of the portions of the casing without the insulating material. The coating has an opening, e.g., opening 430, that exposes a casing portion. The casing is inserted into a borehole through an earth formation (block 1406). A high-frequency alternating current (AC) source, e.g., current source 406, is electrically coupled to the casing and to a return electrode buried in the earth (block 1408). The AC current capacitively coupled from the casing across the insulating material into the formation is measured (block 1410). A property of the formation is determined from the measured AC current (block 1412). The casing and the coating of insulating material define a capacitive electrode having an impedance Zf with a magnitude |Zf| at the frequency of operation f of the high-frequency AC source, Zf being low enough to allow current from the high-frequency AC source to be injected from the casing through the coating of insulating material into a surrounding formation. The casing portion has a resistance R to direct current (DC) with a magnitude that is very large (i.e., $1.0 \times 10^5$ times, $5.0 \times 10^5$ times or $1.0 \times 10^6$ times) compared to |Zf|.

Figure 14B:
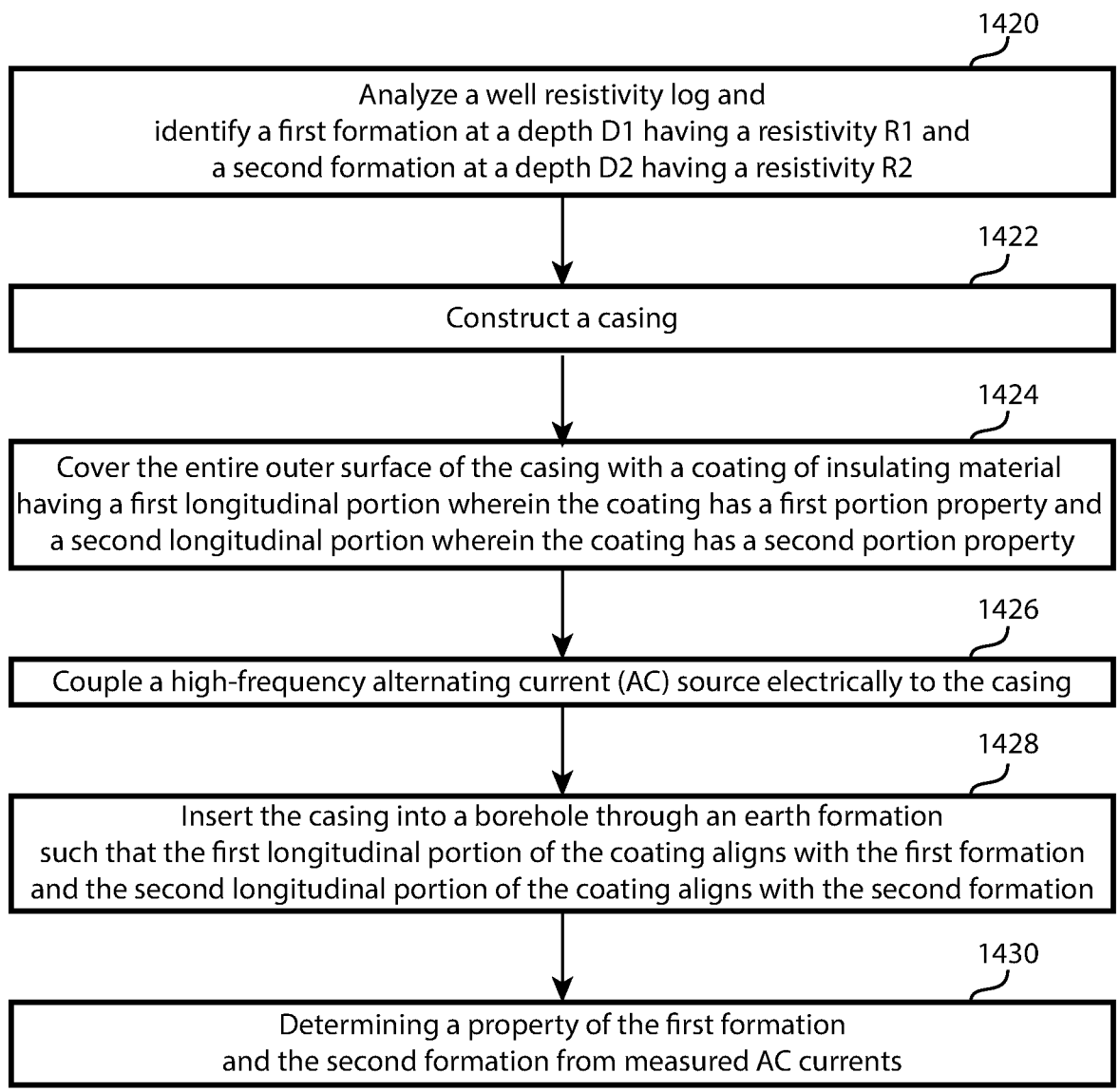
FIG. 14B is a flow diagram of a method usable to perform current injection via capacitive coupling to formations with different resistivities.

FIG. 14B is a flow diagram of a method usable to perform current injection via capacitive coupling to formations with different resistivities. A well resistivity log is analyzed and a first formation, e.g., formation 432, at a depth D1 having a resistivity R1 and a second formation, e.g., formation 434, at a depth D2 having a resistivity R2 are identified (block 1420). A casing, e.g., casing 402, having a plurality of joints of pipe joined by a plurality of casing collars and an outer surface is constructed (block 1422). The entire outer surface of the casing is covered with a coating of insulating material, e.g., coating of insulating material 428, having a first longitudinal portion, e.g., first longitudinal portion 432, wherein the coating has a first portion property and a second longitudinal portion, e.g., second longitudinal portion 436, wherein the coating has a second portion property (block 1424). A high-frequency alternating current (AC) source, e.g., current source 406, is coupled electrically to the casing (block 1426). The casing is inserted into a borehole through an earth formation such that the first longitudinal portion of the coating aligns with the first formation and the second longitudinal portion of the coating aligns with the second formation (block 1428). A property of the first formation and the second formation is determined from measured AC currents (block 1430). The casing and the first longitudinal portion of the coating of insulating material define a first capacitive electrode having a first impedance Zf1 with a magnitude |Zf1| at the frequency of operation f of the high-frequency AC source such that $0.75 \times R1 < |Zf1| < 1.25 \times R1$. The casing and the second longitudinal portion of the coating of insulating material define a second capacitive electrode having a second impedance Zf2 with a magnitude |Zf2| such that $0.75 \times R2 < |Zf2| < 1.25 \times R2$. The casing portion has a resistance R to direct current (DC) with a magnitude that is very large (i.e., $1.0 \times 10^5$ times, $5.0 \times 10^5$ times or $1.0 \times 10^6$ times) compared to |Zf1| and |Zf2|.

In one aspect, an apparatus includes a casing having a plurality of joints of pipe joined by a plurality of casing collars, and an outer surface. The apparatus includes a high-frequency alternating current (AC) source electrically coupled to the casing. The apparatus includes a coating of insulating material that covers the entire outer surface of the casing, wherein the coating has an opening that exposes a casing portion. The casing and the coating of insulating material define a capacitive electrode having an impedance $Z_f$ with a magnitude $|Z_f|$ at the frequency of operation f of the high-frequency AC source. $Z_f$ is low enough to allow current from the high-frequency AC source to be injected from the casing through the coating of insulating material into a surrounding formation. The casing portion has a resistance R to direct current (DC) with a magnitude that is very large compared to $|Z_f|$.

Implementations may include one or more of the following. The coating of insulating material may include a coating selected from one or more of a rust inhibiting agent, a corrosion inhibiting agent, an anti-rust varnish, a rust preventing oil, and a paint. R may be at least $10^5$ times greater than $|Z_f|$. f may be greater than 100 kiloHertz (kHz). The apparatus may include a receiver coupled to the outer surface of the casing. The receiver may have a plurality of electrodes. The plurality of electrodes may be arranged circumferentially about the casing. The plurality of electrodes may be evenly spaced circumferentially about the casing. The opening is caused by wear and tear.

In one aspect, an apparatus includes a casing having a plurality of joints of pipe joined by a plurality of casing collars, and an outer surface. The apparatus includes a high-frequency alternating current (AC) source electrically coupled to the casing. The apparatus includes a coating of insulating material that covers the entire outer surface of the casing. The coating has a first longitudinal portion wherein the coating has a first portion property, and a second longitudinal portion wherein the coating has a second portion property. The casing and the first longitudinal portion of the coating of insulating material define a first capacitive electrode having a first impedance $Z_{f1}$ with a magnitude $|Z_{f1}|$ at the frequency of operation f of the high-frequency AC source. $Z_{f1}$ is low enough to allow current from the high-frequency AC source to be injected from the casing through the first longitudinal portion of the coating of insulating material into a surrounding formation. The casing and the second longitudinal portion of the coating of insulating material define a second capacitive electrode having a second impedance $Z_{f2}$ with a magnitude $|Z_{f2}|$ at the frequency of operation f of the high-frequency AC source. $Z_{f2}$ is low enough to allow current from the high-frequency AC source to be injected from the casing through the second longitudinal portion of the coating of insulating material into a surrounding formation. $Z_{f2} > 1.5 \times Z_{f2}$. The casing portion has a resistance R to direct current (DC) with a magnitude that is very large compared to $Z_{f1}$ and $|Z_{f2}|$.

Implementations may include one or more of the following. The coating may have a first thickness in the first longitudinal portion and a second thickness, different from the first thickness, in the second longitudinal portion. The coating may be made of a first insulating material in the first longitudinal portion and a second insulating material, different from the first insulating material, in the second longitudinal portion.

In one aspect, a method includes constructing a casing having a plurality of joints of pipe joined by a plurality of casing collars, and an outer surface. The method includes covering the entire outer surface of the casing with a coating of insulating material as it is being constructed. The coating has an opening that exposes a casing portion. The method includes inserting the casing into a borehole through an earth formation. The method includes electrically coupling a high-frequency alternating current (AC) source to the casing and to a return electrode buried in the earth. The method includes measuring the AC current capacitively coupled from the casing across the coating of insulating material into the formation. The method includes determining a property of the formation from the measured AC current. The casing and the coating of insulating material define a capacitive electrode having an impedance $Z_f$ with a magnitude $|Z_f|$ at the frequency of operation f of the high-frequency AC source. $Z_f$ is low enough to allow current from the high-frequency AC source to be injected from the casing through the coating of insulating material into a surrounding formation. The casing portion has a resistance R to direct current (DC) with a magnitude that is very large compared to $|Z_f|$.

Implementations may include one or more of the following. The coating of insulating material may include a coating selected from one or more of a rust inhibiting agent, a corrosion inhibiting agent, an anti-rust varnish, a rust preventing oil, and a paint. R may be at least $10^5$ times greater than $|Z_f|$. f may be greater than 100 kiloHertz (kHz). The method may include coupling a receiver to the outer surface of the casing, wherein the receiver has a plurality of electrodes, measuring at the plurality of receiver electrodes a plurality of respective signals, and determining a property of the formation from the measured signals. The plurality of electrodes may be arranged circumferentially about the casing. The plurality of electrodes may be evenly spaced circumferentially about the casing. The opening may be caused by wear and tear.

In one aspect, a method includes analyzing a well resistivity log and identifying a first formation at a depth D1 having a resistivity R1 and a second formation at a depth D2 having a resistivity R2. The method includes constructing a casing having a plurality of joints of pipe joined by a plurality of casing collars, and an outer surface. The method includes covering the entire outer surface of the casing with a coating of insulating material. The coating has a first longitudinal portion wherein the coating has a first portion property, and a second longitudinal portion wherein the coating has a second portion property. The method includes coupling a high-frequency alternating current (AC) source electrically to the casing. The method includes inserting the casing into a borehole through an earth formation such that the first longitudinal portion of the coating aligns with the first formation and the second longitudinal portion of the coating aligns with the second formation. The method includes determining a property of the first formation and the second formation from measured AC currents. The casing and the first longitudinal portion of the coating of insulating material define a first capacitive electrode having a first impedance $Z_{f1}$ with a magnitude $|Z_{f1}|$ at the frequency of operation f of the high-frequency AC source such that $0.75 \times R1 < |Z_{f1}| < 1.25 \times R1$. The casing and the second longitudinal portion of the coating of insulating material define a second capacitive electrode having a second impedance $Z_{f2}$ with a magnitude $|Z_{f2}|$ such that $0.75 \times R2 < |Z_{f2}| < 1.25 \times R2$. The casing portion has a resistance R to direct current (DC) with a magnitude that is very large compared to $|Z_{f1}|$ and $|Z_{f2}|$.

Implementations may include one or more of the following. The coating may have a first thickness in the first longitudinal portion and a second thickness, different from the first thickness, in the second longitudinal portion. The coating may made of a first insulating material in the first longitudinal portion and a second insulating material, different from the first insulating material, in the second longitudinal portion.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a casing having:
      a plurality of joints of pipe joined by a plurality of casing collars, and
      an outer surface;
   a high-frequency alternating current (AC) source electrically coupled to the casing;
   a coating of insulating material that covers the entire outer surface of the casing, wherein
      the coating has an opening that exposes a casing portion; and
   wherein the casing and the coating of insulating material define a capacitive electrode having an impedance $Z_f$ with a magnitude $|Z_f|$ at the frequency of operation f of the high-frequency AC source, $Z_f$ being low enough to allow current from the high-frequency AC source to be injected from the casing through the coating of insulating material into a surrounding formation; and
   wherein the casing portion has a resistance R to direct current (DC) with a magnitude that is very large compared to $|Z_f|$.

2. The apparatus of claim 1 wherein the coating of insulating material comprises a coating selected from one or more of a rust inhibiting agent, a corrosion inhibiting agent, an anti-rust varnish, a rust preventing oil, and a paint.

3. The apparatus of claim 1 wherein R is at least $10^5$ times greater than $|Z_f|$.

4. The apparatus of claim 1 wherein f is greater than 100 kiloHertz (kHz).

5. The apparatus of claim 1 further comprising:
   a receiver coupled to the outer surface of the casing, wherein the receiver has a plurality of electrodes.

6. The apparatus of claim 5 wherein the plurality of electrodes is arranged circumferentially about the casing.

7. The apparatus of claim 5 wherein the plurality of electrodes is evenly spaced circumferentially about the casing.

8. The apparatus of claim 1 wherein the opening is caused by wear and tear.

9. The apparatus of claim 1, wherein:
   the coating has:
      a first longitudinal portion wherein the coating has a first portion property, and
      a second longitudinal portion wherein the coating has a second portion property;
      and
   the casing and the first longitudinal portion of the coating of insulating material define a first capacitive electrode having a first impedance $Z_{f1}$ with a magnitude $|Z_{f1}|$ at the frequency of operation f of the high-frequency AC source, $Z_{f1}$ being low enough to allow current from the high-frequency AC source to be injected from the casing through the first longitudinal portion of the coating of insulating material into a surrounding formation;
   the casing and the second longitudinal portion of the coating of insulating material define a second capacitive electrode having a second impedance $Z_{f2}$ with a magnitude $|Z_{f2}|$ at the frequency of operation f of the high-frequency AC source, $Z_{f2}$ being low enough to allow current from the high-frequency AC source to be injected from the casing through the second longitudinal portion of the coating of insulating material into a surrounding formation; and
   wherein the casing portion has a resistance R to direct current (DC) with a magnitude that is very large compared to $|Z_{f1}|$ and $|Z_{f2}|$.

10. The apparatus of claim 9 wherein the coating has a first thickness in the first longitudinal portion and a second thickness, different from the first thickness, in the second longitudinal portion.

11. The apparatus of claim 9 wherein the coating is made of a first insulating material in the first longitudinal portion and a second insulating material, different from the first insulating material, in the second longitudinal portion.

12. A method comprising:
   constructing a casing having:
      a plurality of joints of pipe joined by a plurality of casing collars, and
      an outer surface;
   covering the entire outer surface of the casing with a coating of insulating material as it is being constructed, wherein the coating has an opening that exposes a casing portion;
   inserting the casing into a borehole through an earth formation;
   electrically coupling a high-frequency alternating current (AC) source to the casing and to a return electrode buried in the earth;

measuring an AC current capacitively coupled from the casing across the coating of insulating material into the formation; and determining a property of the formation from the measured AC current;

wherein the casing and the coating of insulating material define a capacitive electrode having an impedance $Z_f$ with a magnitude $|Z_f|$ at the frequency of operation f of the high-frequency AC source, $Z_f$ being low enough to allow current from the high-frequency AC source to be injected from the casing through the coating of insulating material into a surrounding formation; and wherein the casing portion has a resistance R to direct current (DC) with a magnitude that is very large compared to $|Z_f|$.

13. The method of claim 12 wherein the coating of insulating material comprises a coating selected from one or more of a rust inhibiting agent, a corrosion inhibiting agent, an anti-rust varnish, a rust preventing oil, and a paint.

14. The method of claim 12 further comprising:

coupling a receiver to the outer surface of the casing, wherein the receiver has a plurality of electrodes;

measuring at the plurality of receiver electrodes a plurality of respective signals; and determining a property of the formation from the measured signals.

15. The method of claim 14 wherein the plurality of electrodes is arranged circumferentially about the casing.

16. The method of claim 14 wherein the plurality of electrodes is evenly spaced circumferentially about the casing.

17. The method of claim 12 wherein the opening is caused by wear and tear.

18. A method comprising:

analyzing a well resistivity log and identifying a first formation at a depth D1 having a resistivity R1 and a second formation at a depth D2 having a resistivity R2;

constructing a casing having:
 a plurality of joints of pipe joined by a plurality of casing collars, and
 an outer surface;

covering the entire outer surface of the casing with a coating of insulating material, wherein the coating has:
 a first longitudinal portion wherein the coating has a first portion property, and
 a second longitudinal portion wherein the coating has a second portion property;
 and coupling a high-frequency alternating current (AC) source electrically to the casing;

inserting the casing into a borehole through an earth formation such that the first longitudinal portion of the coating aligns with the first formation and the second longitudinal portion of the coating aligns with the second formation;

determining a property of the first formation and the second formation from measured AC currents;

wherein the casing and the first longitudinal portion of the coating of insulating material define a first capacitive electrode having a first impedance $Z_{f1}$ with a magnitude $|Z_{f1}|$ at the frequency of operation f of the high-frequency AC source such that $0.75 \times R1 < |Z_{f1}| < 1.25 \times R1$;

wherein the casing and the second longitudinal portion of the coating of insulating material define a second capacitive electrode having a second impedance $Z_{f2}$ with a magnitude $|Z_{f2}|$ such that $0.75 \times R2 < |Z_{f2}| < 1.25 \times R2$;

wherein the casing portion has a resistance R to direct current (DC) with a magnitude that is very large compared to $|Z_{f1}|$ and $|Z_{f2}|$.

19. The method of claim 18 wherein the coating has a first thickness in the first longitudinal portion and a second thickness, different from the first thickness, in the second longitudinal portion.

20. The method of claim 18 wherein the coating is made of a first insulating material in the first longitudinal portion and a second insulating material, different from the first insulating material, in the second longitudinal portion.

* * * * *